United States Patent [19]
Kubota et al.

[11] Patent Number: 5,634,600
[45] Date of Patent: Jun. 3, 1997

[54] REFUSE PROCESSING MACHINE

[75] Inventors: Tadashi Kubota, Katano; Motomichi Mishima, Takarazuka; Yukio Hayashida, Amagasaki; Hisao Tsunaga, Minou; Hideaki Sakatani, Takarazuka; Hirofumi Nishida, Osaka; Katsuyuki Ishibashi, Youkaichi; Tatsuo Kikawa, Oumihachiman; Syuji Asada, Youkaichi; Tatsuo Fujita, Osaka; Yukiyoshi Nishikori, Oumihachiman; Hidenori Kitamura, Gamou-gun; Syuzo Tokumitu, Kawanishi; Kenichiro Sunaba, Oumihachiman, all of Japan

[73] Assignee: Matsushita Electric Industrial Co., Ltd., Osaka, Japan

[21] Appl. No.: 225,329

[22] Filed: Apr. 8, 1994

[30] Foreign Application Priority Data

| Apr. 9, 1993 | [JP] | Japan | 5-082993 |
| Apr. 12, 1993 | [JP] | Japan | 5-084564 |
| Jul. 30, 1993 | [JP] | Japan | 5-190008 |
| Oct. 21, 1993 | [JP] | Japan | 5-263406 |

[51] Int. Cl.⁶ ............................... B02C 18/40
[52] U.S. Cl. .................. 241/36; 241/65; 241/199.12; 241/DIG. 38
[58] Field of Search .................. 241/65, 199.12, 241/DIG. 38, 606, 36

[56] References Cited

U.S. PATENT DOCUMENTS

| 5,123,600 | 6/1992 | Takenaka | 241/46.013 |
| 5,186,400 | 2/1993 | Ignjatovic et al. | 241/39 |
| 5,209,411 | 5/1993 | Dineley et al. | 241/17 |
| 5,240,187 | 8/1993 | Wilson | 241/21 |
| 5,292,637 | 3/1994 | Bohnensieker | 435/3 |
| 5,377,921 | 1/1995 | Wirth | 241/29 |
| 5,447,685 | 9/1995 | Sievert et al. | 241/65 X |

FOREIGN PATENT DOCUMENTS

| 0165578 | 12/1985 | European Pat. Off. . |
| 05024601 | 2/1993 | Japan . |
| WO8803053 | 5/1988 | WIPO . |
| WO9116134 | 10/1991 | WIPO . |

*Primary Examiner*—John M. Husar
*Attorney, Agent, or Firm*—McDermott, Will & Emery

[57] ABSTRACT

The refuse processing machine of the invention reduces the bulk of the waste by heating and drying the waste in the waste container by heating means. The grinding and stirring means is operated while heating and drying, and the waste is ground and stirred. The waste is ground into small pieces by the grinding and stirring means, and heat of the heating means is hence smoothly transmitted to the inside of the waste, so that the moisture in the waste may be removed efficiently.

22 Claims, 18 Drawing Sheets

26 CRUSHING BLADE

| ROTARY BLADE 4 | STOP ▨ | STOP ▨ | STOP ▨ | STOP |
|---|---|---|---|---|
| ROTATING DIRECTION | CLOCKWISE | COUNTERCLOCKWISE | CLOCKWISE | |
| STATIONARY BLADE 5 | STOP ▨ | STOP ▨ | STOP ▨ | STOP |
| ROTATING DIRECTION | COUNTERCLOCKWISE | CLOCKWISE | COUNTERCLOCKWISE | |

REFUSE PROCESSING MACHINE

BACKGROUND OF THE INVENTION

1. Field of the Invention

The present invention relates to a refuse processing machine for processing refuse such as general domestic kitchen waste, and more particularly to a refuse processing machine capable of reducing the bulk of the refuse by heating and drying kitchen waste to remove moisture contained in the refuse.

2. Description of the Related Art

As conventional refuse processing machines, the disposer for crushing the waste to discharge into sewage, and waste dewatering machine for crushing, dewatering and recovering the waste are known. The disposer contaminates the river in the district without sewage treating plant, and causes environmental pollution. On the other hand, the waste dewatering machine recovers the dewatered waste and does not cause environmental pollution, but the recovered waste is likely to putrefy and release offensive smell when left untreated. Accordingly, the deodorized and recovered waste must be stored at low temperature, or frequently transported to the public garbage site for treatment.

Thus, the conventional refuse processing machines caused environmental pollution, or required much later in the treatment after processing in the refuse processing machine.

To solve these problems, a heating type refuse processing machine for drying and heating the waste has been proposed. That is, hot air is sent into kitchen waste containing much moisture to remove moisture contained in the waste, and the bulk of the waste is significantly reduced, and the waste is heated to a dry state, and therefore it is hard to rot and release smell if stored.

In this refuse processing machine of heating type, however, it is necessary to heat for a long time to remove much moisture contained in the waste, and a long time is required for drying processing process. Or if heated for a short time, moisture cannot be removed sufficiently and the waste is left in half damp state, which causes malodor due to rotting, and poses sanitary problems.

SUMMARY OF THE INVENTION

To solve the problems, the invention presents a refuse processing machine comprising a waste container, grinding and stirring means for grinding and stirring the waste in the waste container, heating means for heating and drying the waste in the waste container, and a condenser for condensing the steam generated from the waste in the waste container.

In the refuse processing machine, first the waste is put in the waste container and heated and dried by the heating means. In this heating and drying period, the grinding and stirring means grinds and stirs the waste. Since the waste is put into the waste container in various sizes, large particles are ground to small pieces by the grinding and stirring means, so that the heat by the heating means is smoothly transmitted into the inside of the waste, thereby efficiently removing the moisture in the waste. Therefore, the heating time for removing the moisture of the waste may be shortened. The steam generated from the waste by heating Is removed in the condenser, and therefore the steam is not directly released to the outside.

BRIEF DESCRIPTION OF THE DRAWINGS

FIG. 2 (a) is a sectional view of essential parts of waste grinding and stirring means in the refuse processing machine, and (b) is a perspective view of essential parts showing the rotary shaft of the stirring means in the refuse processing machine.

DETAILED DESCRIPTION

Figure 1A:
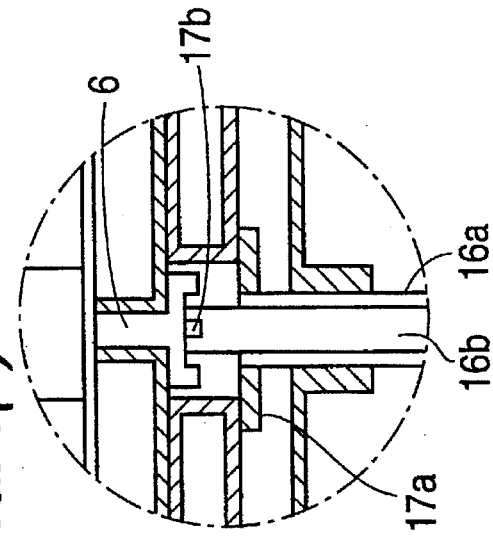
FIG. 1 is a sectional view of a refuse processing machine in a first embodiment of the invention.
Figure 1:
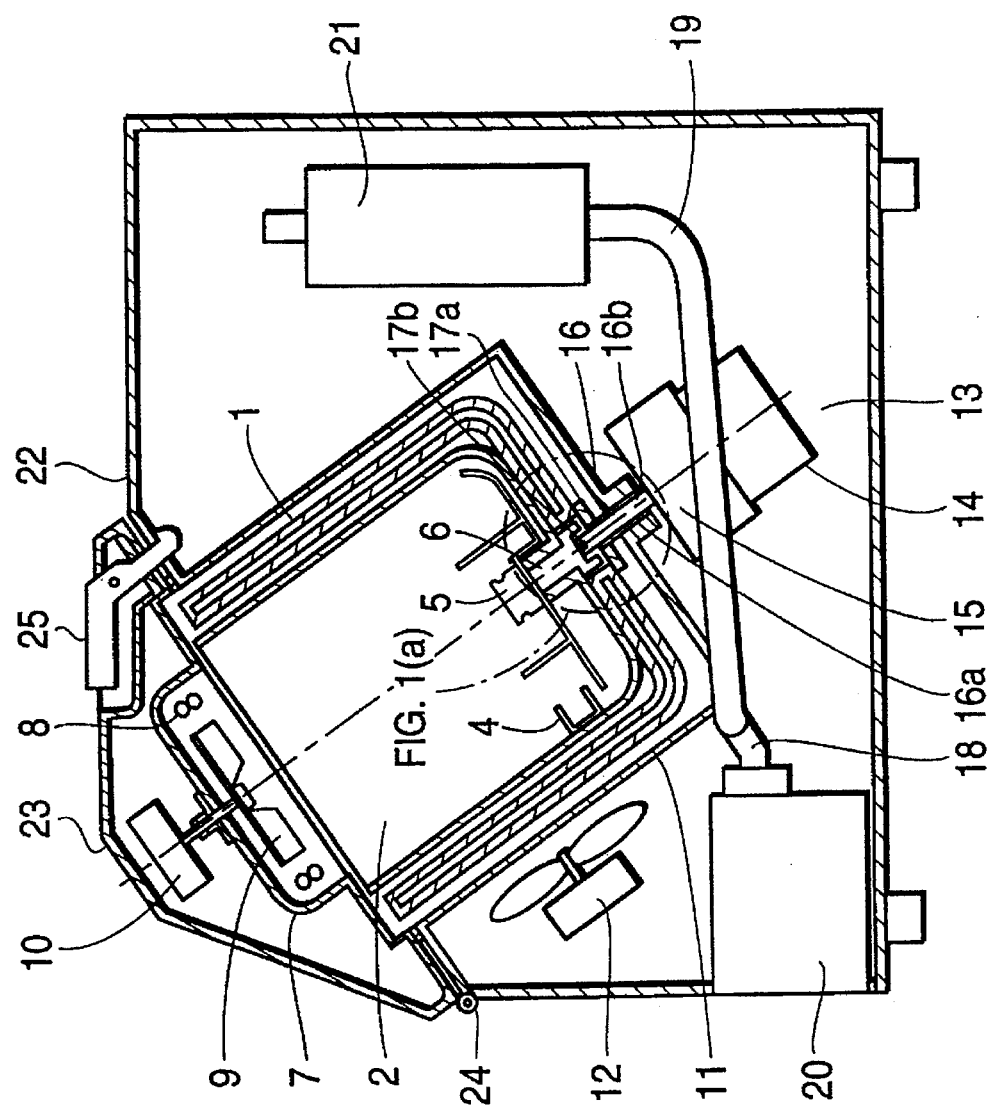

The first embodiment of the invention is described below while referring to FIG. 1 and FIG. 2.

In the diagrams, numeral 1 is an insulated container (in FIG. 1, for example, a vacuum insulated container with a vacuum space being composed of an inner wall and an outer wall), and 2 is a waste container installed in the insulated container in a manner free to put in and take out, in the waste container 2, as the waste grinding and stirring means, a stationary blade 4 and a rotary blade 5 are provided. The stationary blade 4 is provided in the inner wall in the waste container 2, and the rotary blade 5 is put in the inner bottom of the waste container 2, and fixed on a rotary shaft 6 extending from the bottom of the waste container 2. Above the waste container 2, a heater 8 is provided as heating means of waste, and an agitation fan 9 is provided for feeding the heat of the heater 8 uniformly into the waste container 2. Numeral 10 is a motor for driving the agitation fan.

On the outer circumference of the insulated container 1, an outer container is disposed to constitute to cool and condense the steam generated from the waste when passing between the outer container and the insulated container. That is, the outer container functions as a condenser 11, and a blowing fan 12 for cooling the outer surface is provided outside the condenser 11, so that the condensing capacity of the condenser 11 may be enhanced. The insulated container 1 and the waste container 2 are installed in a sloped state in this embodiment, and they are designed to rotate in unison. Accordingly, the rotation of a driving motor 14 is transmitted to a drive shaft 16 through a reduction gear 15, and this drive shaft 16 consists of two shafts, that is, an outside shaft 16a and an inside shaft 16b. The outside shaft 16a is engaged with the insulated container 1 through a coupling 17a to rotate the insulated container 1 and waste container 2. The inside shaft 16b is engaged with the rotary shaft 6 through a coupling 17b to rotate the rotary blade 5. The outside shaft 16a and inside shaft 16b of the drive shaft 16 are designed to rotate in mutually different directions.

In the lower part of the condenser 11, a condensate discharge pipe 18 and an exhaust pipe 19 are connected. At the front end of the condensate discharge pipe 18, a condensate container 20 for collecting the condensate is detachably installed. Numeral 22 is a refuse processing machine main body, and 23 is a lid accommodating waste heating means. The lid 23 is supported by a hinge 24, and is free to open and close above the refuse processing machine main body 22, and the lid 23 and the refuse processing machine main body 22 are fixed by a latch type handle 25 through an interposed packing, so that the waste container is sealed tightly.

Figures 2A, 2B, 3:
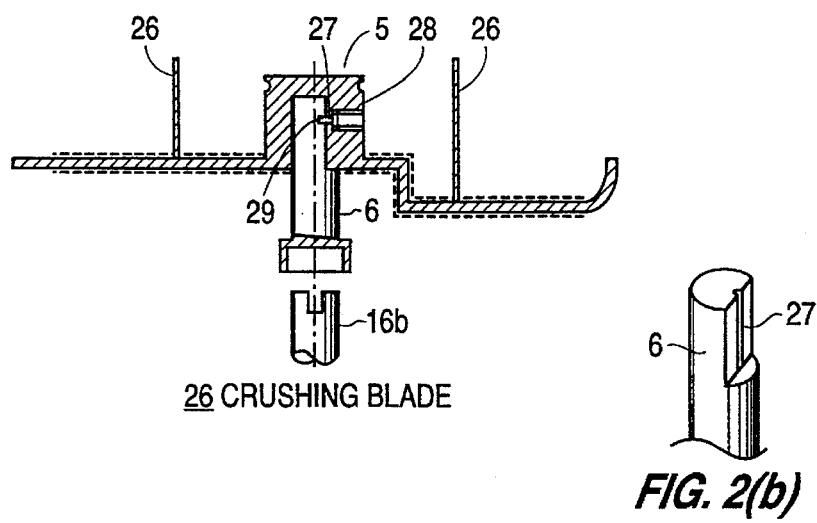
FIG. 3 is a diagram showing rotation control state of rotary blade and stationary blade in the refuse processing machine.

The stationary blade 4 and rotary blade 5 are controlled so as to rotate in mutually different directions as shown in FIG. 3, rotate intermittently while repeating rest and rotation, and invert the rotating direction alternately in every revolution. The stationary blade 4 and rotary blade 5 compose the drive shaft 15 in two-shaft structure, and the outside shaft 16a and inside shaft 16b rotates in mutually different directions, and therefore the rotary blade 5 and the waste container 2 mutually differ in rotating direction, and hence the rotary blade 5 and the stationary blade 4 provided in the waste container 2 rotate mutually in reverse directions. As a result, the waste charged into the waste container 2 is scooped up by the stationary blade 4 and stirred, and ground between the stationary blade 4 and rotary blade 5. What is more, since the stationary blade 4 and rotary blade 5 rotate in mutually reverse directions, the relative speed of the stationary blade 4 and rotary blade 5 is increased, so that the waste grinding capacity may be enhanced.

When the stationary blade 4 and rotary blade 5 rotate continuously, cooked rice and other starch particles in waste become glutinous to form a kind of jelly, making it difficult to dry inside. Therefore, by rotating intermittently and in a short time (for example, rotating 5 seconds and stopping 60 seconds), the starch is prevented from becoming glutinous. Or when rotated in one direction only, waste particles are likely to be collected between the stationary blade 4 and rotary blade 5, and the rotary blade 5 is likely to be locked.

Therefore, by changing the rotating direction every time in intermittent rotation, locking of rotary blade 5 is prevented.

Moreover in part of the rotary blade 5, a crushing blade 26 for crushing the waste bag is disposed in the vertical direction. The rotary blade 5 is mainly for grinding and stirring the waste. The waste being contained in a bag (polyethylene bag or the like) is charged into the waste container 2, and ground and dried. In this case, since the rotary blade 5 rotates, the crushing blade 26 provided in the rotary blade 5 also rotates in the bottom of the waste bag to tear the bag. The waste spills out from the bag, and ground by the tip of the rotary blade 5 and stationary blade 4. Thus, the waste can be charged into the waste container 2 without taking out of its bag, so that the utility of the refuse processing machine may be enhanced.

The rotary blade 5 and rotary shaft 6 are composed so as to be detachably engaged with each other. That is, as shown in FIG. 2, the front end of the rotary shaft 6 has a section of approximately D-shape, and a fine groove 27 is partly formed. Similarly, in the middle of the rotary blade 6, a hole of D-shaped section is provided, and a protrusion 29 thrust by a spring 28 is projecting therein. When the rotary blade 5 is inserted into the front end of the rotary shaft 6, the protrusion 29 gets into the groove 27, and the rotary blade 5 and rotary shaft 6 are engaged with each other, or, to the contrary, when the rotary blade 5 is pulled by hand, it can be easily detached. Therefore, when the inside of the waste container 2 is contaminated or waste is scorched to stick to the rotary blade 5, by detaching the rotary blade 5, the waste container 2 and rotary blade 5 can be washed, and it is designed to be cleaned easily.

The surface of the rotary blade 5 is made of plastics. That is, when the rotary blade 5 is made of metal, leaving the front end edge portion, the other surface is covered with plastics (shaded area in FIG. 2). Or the rotary blade 5 may be entirely made of plastics. Since the plastics are high in non-stickiness as compared with metals, and in this constitution, the waste is hardly scorched to stick to the rotary blade 5 in the course of grinding and drying, and if depositing, it can be wiped away easily, so that it is easier to clean.

If the stationary blade 4 is composed same as the rotary blade 5, scorching of waste may be more effectively eliminated.

In thus composed refuse processing machine, the operation is described below. The waste charged into the waste container 2 is ground between the rotary blade 5 and stationary blade 4 which rotate mutually in reverse directions and invert the rotating direction every time. At the same time, it is heated by the heater 8, and heat is uniformly diffused in the waste container 2 by the agitation fan 9. The waste container 2 rotates in an inclined state, and the stationary blade 4 provided in the inner wall of the waste container 2 scoops up the waste at this time, and the ground waste is stirred. Steam containing smell is released from the waste, and flows into the condenser 11 outside the insulated container 1 from the opening of the waste container 2.

The steam is cooled and condensed by the blowing fan 12 in the condenser 11, and passes through the condensate discharge pipe 18 and is collected in the condensate container 20. The remaining steam containing odor substances not condensed completely is led from the exhaust pipe 19 into the deodorizing device 21, where odor substances are purified. The ground and dried waste is left over in the waste container 2, but the bulk is reduced, and the moisture activity is lowered by drying, and if it is left over in the waste container 2, it does not rot or form molds. Therefore, until the waste container 2 is filled up, fresh waste may be put over the dry waste to continue drying process. The dry waste left over in the waste container 2 and the condensate collected in the condensate container 20 are periodically recovered and discarded.

In this embodiment, since the waste is ground by the stationary blade 4 and rotary blade 5, large lumps of waste can be ground to small pieces, and heat may be smoothly transmitted to the inside of the waste, and hence the moisture in the waste can be removed efficiently. Thus, the time for drying the waste can be shortened.

Incidentally, in this embodiment, in order to enhance the waste stirring effect, the waste container 2 is rotated in an inclined state, but the stirring action can be obtained by the rotary blade alone 5, and in such a case the waste container 2 may be fixed in vertical direction.

Figure 4:
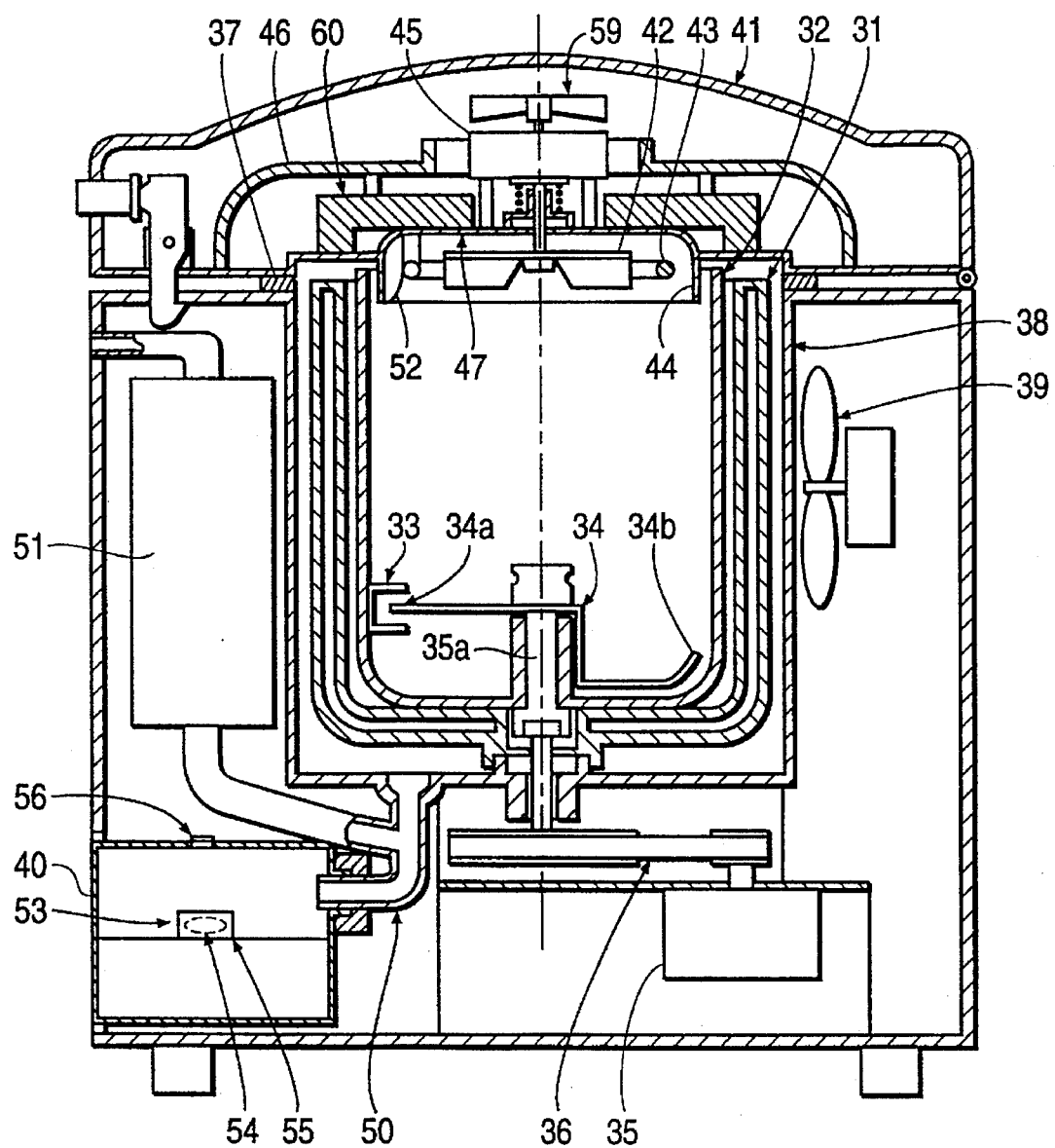
FIG. 4 is a sectional view of a refuse processing machine in a second embodiment of the invention.

Below is explained the second embodiment in which the waste container is fixed in vertical direction. This embodiment is described by reference to FIGS. 4 to 7. In FIG. 4, numeral 31 is an insulated container, and an air layer is formed as an insulating layer between double walls. Numeral 32 is a waste container installed in the insulated container 31. A stationary blade 33 is provided in the inner wall of the waste container 32. Numeral 34 is a rotary blade consisting of upper and lower blades, which rotate while one blade 34a is almost level to the stationary blade 33 and the other one 34b is intersecting nearly vertical to the stationary blade 33, and the rotation of a motor 35 is transmitted to a rotary shaft 35a on which the rotary blade 34 is mounted through a belt 36. By the stationary blade 33 and rotary blade 34, grinding and stirring means for grinding and stirring the waste in the waste container 32 is composed.

On the outer circumference of the insulated container 31, an outer container is disposed, and the steam generated from the waste passes through between the outer container and the insulated container 31, and is cooled and condensed in this process. That is, the outer container functions as a condenser 38, and a blowing fan 39 for cooling the outer surface is provided outside the condenser 38, so that the condensing capacity in the condenser is enhanced. Numeral 40 is a condensate container for recovering and collecting the condensate flowing out from the condenser 38. Numeral 41 is a lid provided to be free to open and close on the upper part of the refuse processing machine main body, and the inlet of the waste is sealed with a packing 37. Numeral 42 is an agitation fan which is a centrifugal fan for agitating the air in the waste container 32, and the plane of rotation is set almost parallel to the lower surface 47 of the lid 41, and projecting to the upper opening of the waste container 42. Numeral 43 is a heater for heating the agitation air by the agitation fan 42 to blow hot air, and is disposed on the outer circumference of the agitation fan 42. Drying means for drying the waste is constituted by the agitation fan 42 and heater 43. Meanwhile, the insulated container 31, upper end of waste container 32, and lower surface 47 of the lid 41 are arranged across a gap mutually.

Figure 7:
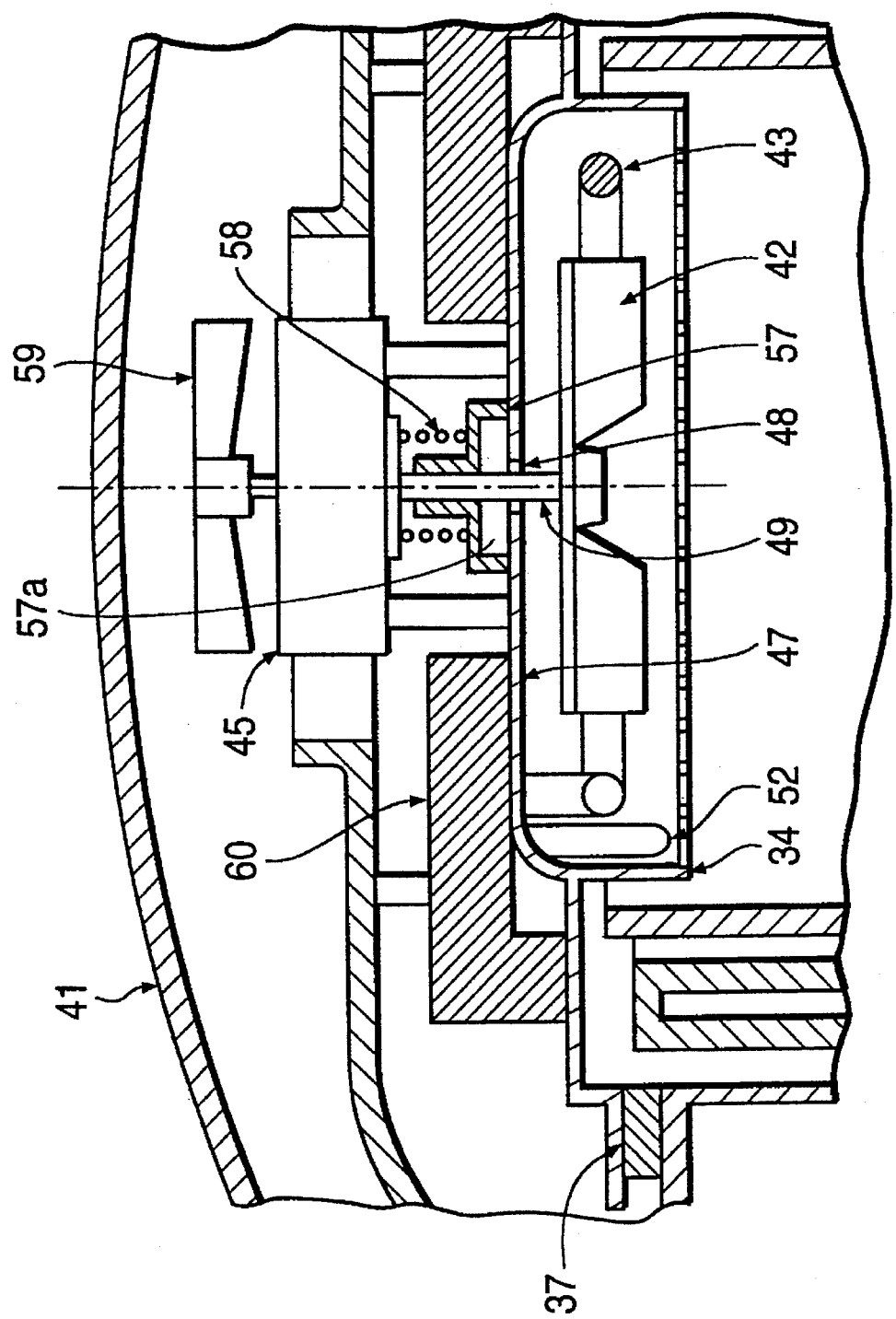
FIG. 7 is a magnified sectional view of a drive motor unit of the refuse processing machine.

Numeral 44 is a hood provided in the lower surface 47 of the lid 41, and is designed to lead the hot air discharged from the agitation fan 42 into the waste container 32. Numeral 45 is a drive motor for driving the agitation fan 42, and it is installed in the lid 41 together with a cover 46 and an insulator 60. The shaft 49 of the drive motor 45 penetrates through the lower surface 47 of the lid 41 as shown in FIG. 7, and a bearing 57 having a grease cup 57a is provided slidably so as to cover the penetration part 48. The bearing 51 is thrust to the lower surface 47 side of the lid 41 by a spring 58. A self-cooling fan 59 is provided in the shaft 49.

Besides, as shown in the condenser 38 and condensate container 40 are coupled with a hose 50, and the hose 50 is branched, and coupled to the deodorizing device 21. In the condensate container 40, a detector 53 comprising a float switch for detecting the full level of condensate is provided, and in this embodiment it is constituted with a float 55 incorporating a magnet 54 and a reed switch 56. The condensate container 40 is disposed closely to a deodorizing device 51 which is relatively high in temperature when the power source is supplied, and its heat acts on the detector 53. Further, near the heater 43, a temperature sensor 52 is provided in the passage of exhaust air from the agitation fan 42, and the temperature of the heater 43 is controlled.

In thus constituted refuse processing machine, the operation is described below. The waste charged into the waste container 32 is stirred by the rotary blade 34, and ground by the rotary blade 34 and stationary blade The hot air from the agitation fan 42 and heater 43 circulates in the space formed by the lower surface 47 of the lid 41, the hood 44 and the waste container 32, and heats the waste while agitating the air in the space. Steam is generated from the heated waste, and flows out to the condenser 38 from the clearance between the upper end of the waste container 32 and the lower surface 47 of the lid 41. By the function of the insulated container the temperature is low in the condenser 38 as compared with the inside of the waste container 32, and the steam is condensed to be water, and collected in the condensate container 40. On the other hand, the steam containing odor substances not condensed completely is led into the deodorizer 51 from the branch hose, and odor substances are purified and discharged outside. The ground and dried waste remains in the waste container 32, but the bulk is reduced, and the moisture activity is lowered by drying, and hence it does not rot or form mold if left over.

The time required for drying the waste is shortened by designing to start grinding and stirring by the rotary blade 34 after a specific time (about 30 minutes if the case of 400-watt heater) after start of heating by agitation fan 42 and heater 43. That is, the waste charged into the waste container 32 is first heated by the heater 43 and agitation fan 42, and the waste surface is sufficiently heated. Before reaching a specific time after start of heating, grinding and stirring by rotary blade 34 will not be started, and the bulk of the waste is not reduced, and therefore the distance from the waste surface to the heater 43 and agitation fan 42 is not extended, so that the waste surface may be heated effectively and rapidly. By rapid heating, the moisture of the waste surface is evaporated, and this steam obtains heat to be overheated steam. In this way, by operating the rotary blade 34 to start grinding and stirring after the waste surface is sufficiently dried, the waste surface is mixed with the inside of the waste still containing much moisture, and the waste surface absorbs the moisture inside the waste. Thereafter, sequentially, the waste surface and inside of waste are mixed, and drying is promoted inside the waste, while the waste is heated by the heater 43 and agitation fan 42 and also by the superheated steam, so that drying of waste is accelerated, thereby shortening the drying time.

Herein, when the condensate container 40 is filled up, the detector 53 functions to control so that next operation cannot be started unless the condensate is discarded. The capacity of the condensate container 40 has an allowance for extra one processing portion of condensate, and therefore at the moment of function of the detector 53, if the detector 53 works in the midst of operation, the operation continues to the end, but next operation cannot be started unless the condensate is discarded, so that water may not overflow from the condensate container 40. If the ambient temperature is lowered and the condensate is frozen and the detector 53 fails to function, water may overflow, but since the deodorizer 51 which is a heating source is installed near the detector 53, the frozen condensate is melted by the heat of the deodorizer 51 in operation, so that the detector 53 functions normally, thereby preventing overflow of water.

Figure 5:
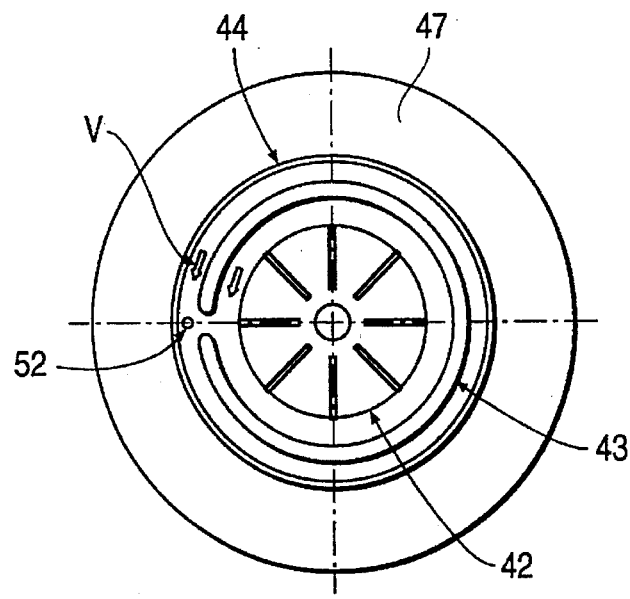
FIG. 5 is a plan view of a stirring fan area of the refuse processing machine.

The action of the agitation fan 42 is explained below by reference to FIG. 5. The wind discharged from the agitation fan 42 has a flow velocity V in the rotating direction of the agitation fan 42 as show in FIG. 5, and is guided by the hood 44 and sent into the waste container 32 to heat the waste, and is sucked again into the agitation fan 42 from the central part of the agitation fan 42. Therefore, since the hot air rotates about the outer circumference of the heater 43 at high speed, the temperature sensor 52 installed near the heater 43 is influenced by the steam, rather than by the radiation heat from the heater 43, when the hot air contains steam in the midst of drying, and measures the temperature of the steam, that is, the temperature inside the waste container 82. As a result, the heater 43 is turned on frequently to reach the drying temperature in the waste container 32, thereby quickening the drying.

As the drying is promoted and the steam in the hot air decreases, the temperature sensor 52 comes to be influenced more by the radiation heat from the heater 43, and hence measures the temperature of the heater 43 itself. Therefore, when the steam decreases and the temperature of the heater 43 rises quickly, the temperature sensor 52 measures the temperature of the heater 43 itself, and overheating of the heater 43 is prevented, while the power consumption of the heater is saved.

Figure 6A:
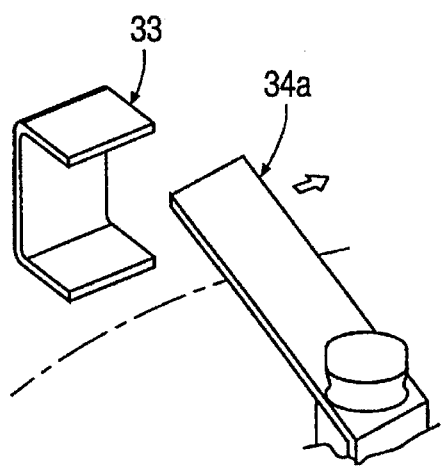
FIG. 6 (a) is a perspective view of essential parts showing one side of the relation of stationary blade and rotary blade in the refuse processing machine, and (b) is a perspective view of essential parts showing the other side.
Figure 6B:
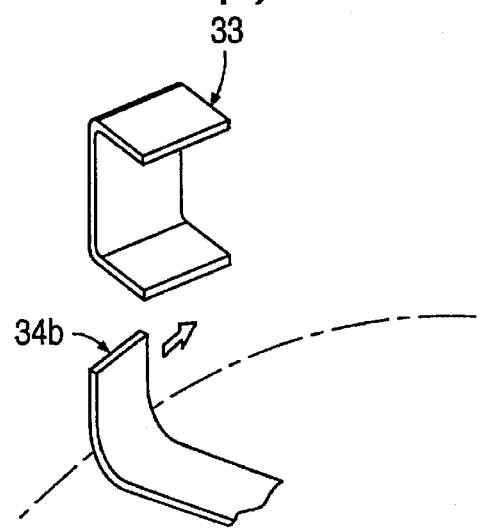

The grinding and stirring action of the waste is described while referring to FIG. 6. The rotary blade 34 is composed of upper and lower blades, and the front end of one blade 34a intersects nearly parallel to the stationary blade 33 as shown in FIG. 6(a), and the front end of the other blade 34b intersects nearly vertically to the stationary blade 33 as shown in FIG. 6(b). Therefore, since the mutual intersecting angles are different, the waste can be ground efficiently, and moreover if the intersecting angle is one direction, the waste is likely to entangle on the stationary blade 33, but by varying the intersecting angle, such entangling can be prevented. In addition, since the rotary blade consists of upper and lower blades, the waste moves not only in the rotating direction but also in the vertical direction, and the stirring is efficient and drying of the waste is promoted. Still more, since the stirring performance of the waste is enhanced, the waste can be efficiently stirred without inclining the waste container.

The relation of the stirring means 42, drive motor 45, and lid 41 is described in FIG. 7. The bearing 57 slidably disposed on the shaft 49 of the drive motor 45 is provided with a grease cup 57a, and seals the gap by covering the gap between the shaft 49 of the drive motor 45 and the penetration part 48, and hence the gap between the shaft 49 and the penetration part 48 can be set with an allowance, thereby making it possible to cope with fluctuations of the gap due to vibration of thermal expansion. Moreover, the bearing 57 and spring 58 are air-cooled by self-cooling fan 59, and the heat transmitted from the agitation fan 42 to the drive motor 45 is cooled off to decrease the temperature rise of the drive motor 45.

Figure 8:
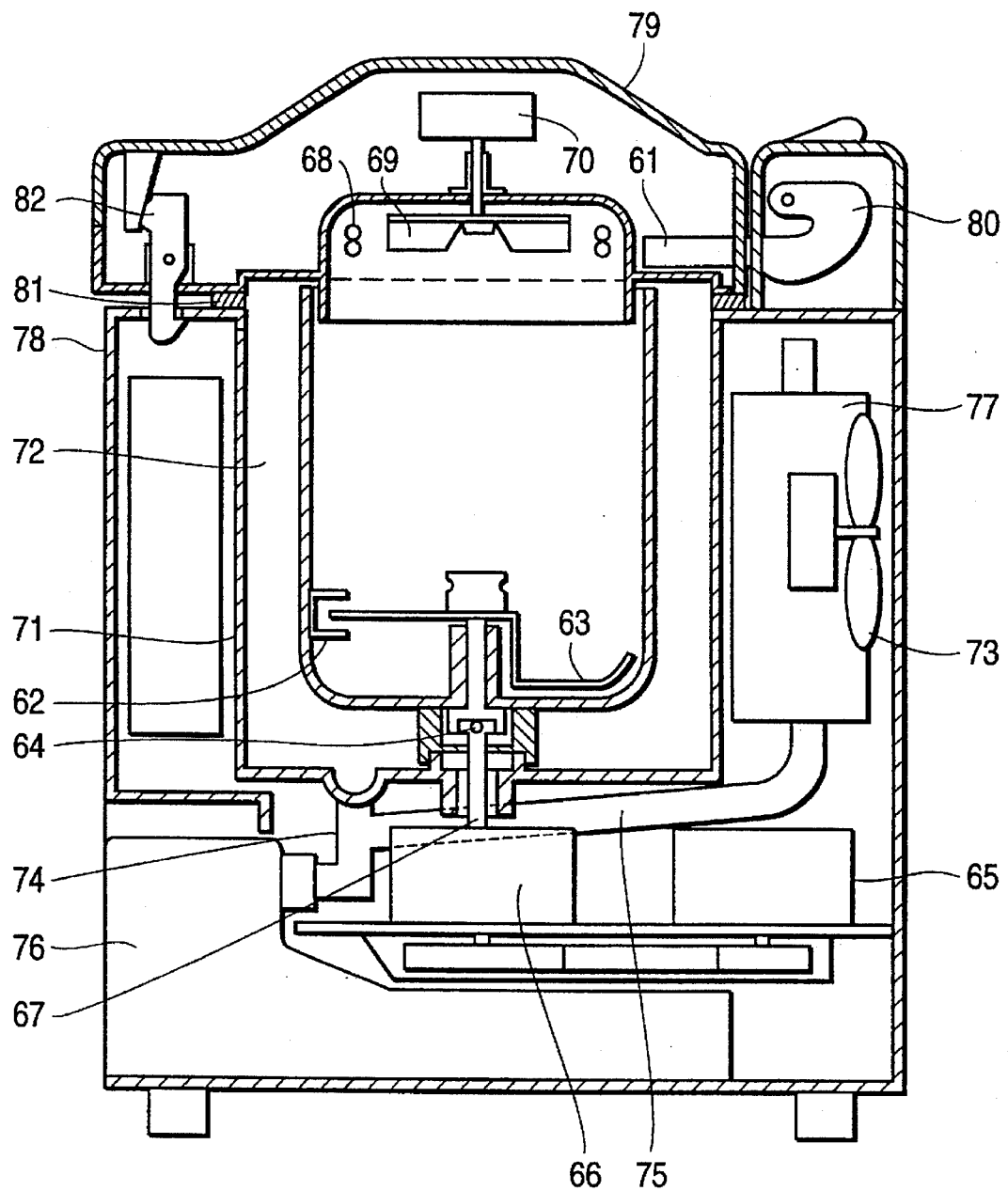
FIG. 8 is a sectional view of a refuse processing machine in a third embodiment of the invention.

The third embodiment of the invention is described by reference to FIG. 8. In the diagram, numeral 61 is a waste container, and a stationary blade 62 and a rotary blade 63 for grinding and stirring the waste are disposed in the waste container 61. The rotary blade 63 is fixed to a rotary shaft 64 projecting from the bottom of the waste container 61. The rotary shaft 64 is engaged with a drive shaft 67 by way of a drive motor 65 and a reduction gear 66. Above the waste container 61 are installed a heater 68 for heating the waste and an agitation fan 69. Numeral 70 is a motor fan for rotating and driving the agitation fan 69. Outside the waste container 61, an outer container 71 is disposed, and a condenser 72 for condensing the steam is composed by the outer container 71 and the waste container 61, and the outer container 72 is cooled by force by a cooling fan 73. The waste container 61 is detachably disposed in the outer container 71, and it is designed to take out the waste container 61 from the refuse processing machine main body when discarding the waste.

In the bottom of the outer container 61, a condensate discharge pipe 74 and an exhaust pipe 75 are provided. At the front end of the condensate discharge pipe 74, a condensate container 76 for collecting the condensate is installed. At the downstream side of the exhaust pipe 75, a catalytic reaction device 77 is provided as deodorizer. The catalytic reaction device 77 is composed of catalyst and a heater for heating the catalyst to a catalytic reaction temperature. By the catalytic reaction device 77, the odor released from the outer container 61 is removed by the catalyst, and sent out of the refuse processing machine main body 78. Numeral 78 is the refuse processing machine main body and 79 is a lid. The lid 79 is borne by a hinge 80 so as to be free to open and close, and when closing, the lid 79 and the refuse processing machine main body 78 are fixed in sealed state by a latch 82 through a packing 81 which is sealing means.

In this embodiment, the waste container 61 is composed of an insulating material small in heat conduction, such as synthetic resin. By this constitution, the insulating effect of the waste container 61 is improved, and the heat heated by the heater 68 and agitation fan 69 is prevented from escaping out to the outer container 71 side, in particular, in the constitution for enhancing the condensing performance by cooling the outer container 71 by force by the cooling fan 73, the heat in the waste container 61 is likely to escape to the outer container 71 side, and lowering of heating efficiency can be prevented by composing the waste container 61 by synthetic resin. Moreover, when the waste container 61 is made of synthetic resin, the weight is reduced, and the waste container 61 can be easily taken out of the refuse processing machine main body 71, so that the waste container 61 can be handled favorably when discarding the waste in the waste container 61.

In this embodiment, the waste container is composed of synthetic resin insulating material, but it may be also composed in an insulator structure of double walls with an air layer.

Figure 9:
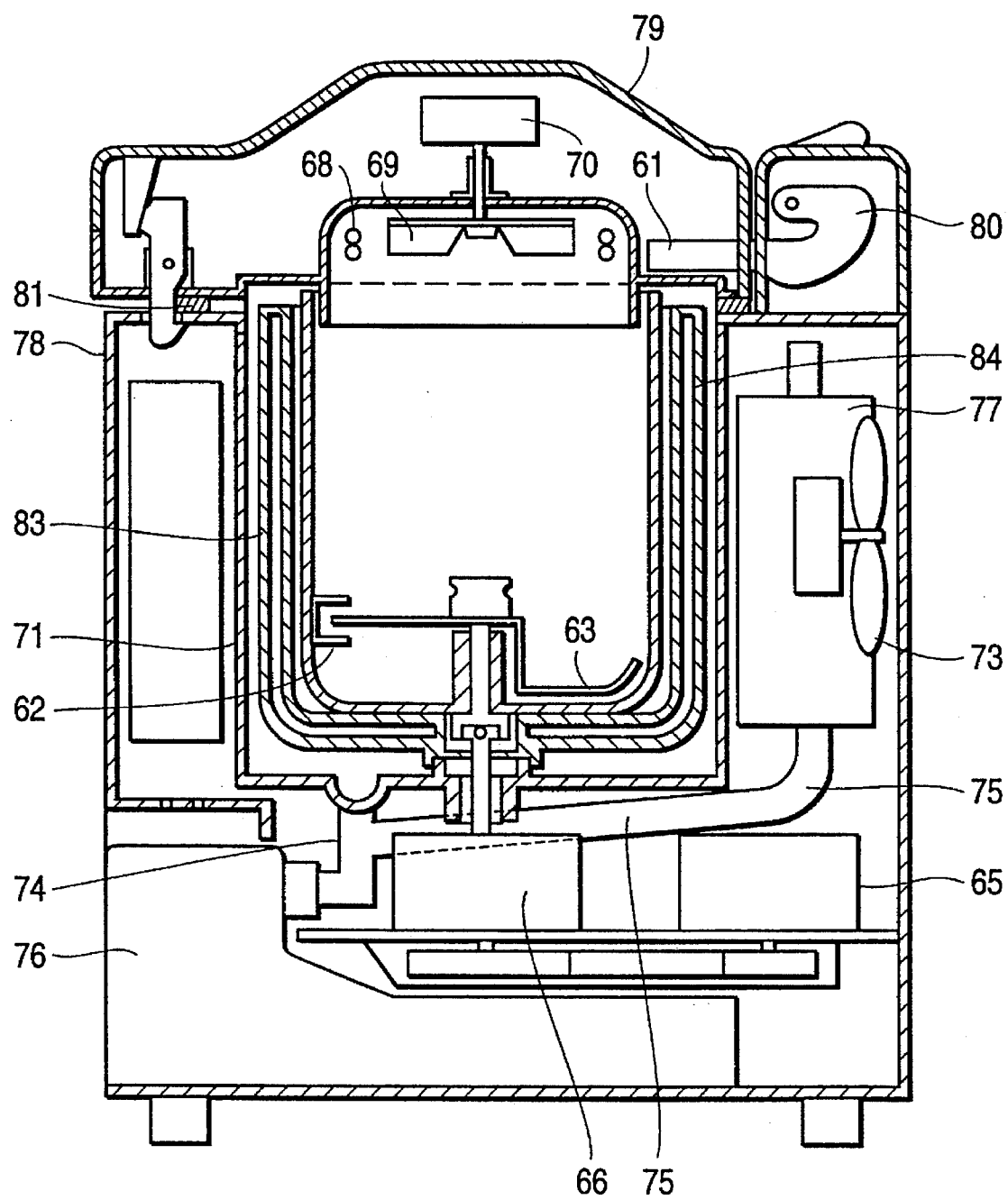
FIG. 9 is a sectional view of a refuse processing machine in a fourth embodiment of the invention.

The fourth embodiment of the invention is described while referring to FIG. 9. The same constituent parts as in the third embodiment are identified with same reference numerals, and explanations are omitted. It is a feature of the embodiment that a middle container 83 is provided as a partition between the waste container 61 and the outer container 71. The middle container 83 has double walls with an air layer 84 in an insulated structure. By the provision of the middle container 83, the heat escaping from the waste container 61 to the outer container 71 side is shut off, and elongation of drying time due to loss of heat can be prevented. Moreover, by composing the waste container 61 of an insulating material made of synthetic resin, the insulating effect is further enhanced, and the drying time can be shortened. Next is explained the packing 81 which is sealing means. The packing 81 is made of a material mainly composed of nitrite hydride rubber with 25% to 36% of acrylonitrile, and is designed to keep airtight between the lid 79 and the upper edge of the outer container 71 when the lid 79 is closed. The packing 81 prevents the steam containing smell released from the waste container 61 from leaking out from the gap between the lid 79 and the outer container 71. However, since the packing 81 is influenced by the steam of high temperature or heat of the heater 68 provided in the lid 79, it is necessary to select a material having a high durability to heat. Table 1 and Table 2 show the characteristic comparison between the general materials and the materials used in the packing of the embodiment, as the packing to be used in the parts exposed to high temperature.

TABLE 1

Comparison of rubber material

|  | Nitrile hydride rubber | Fluoro- rubber | Silicone rubber |
| --- | --- | --- | --- |
| Gas barrier property | O | O | X |
| Resistance to heat aging 130 C. × 168 H | O | O | O |
| Resistance to steam 130 C. × 168 H | O | O | X |
| Resistance to acid (table vinegar) 95 C. × 168 H | O | X | Δ |
| Resistance to salad oil 95 C. × 168 H | O | O | O |
| Resistance to lard 95 C. × 168 H | O | O | Δ |
| Resistance to neutral detergent 95 C. × 168 H | O | O | O |
| Resistance to ozone | O | O | O |
| Compression set | O | O | O |

TABLE 2

Components and properties of nitrile hydride rubber

| Nitrile content | Hydrogen content | Heat, chemical resistance | Forming |
| --- | --- | --- | --- |
| 44% | 99.8% | ⊙ | X |
| 36% | 99.8% | ⊙ | O |
| 29% | 95% | ⊙ | O |
| 25% | 95% | O–⊙ | O |
| 20% | 95% | Δ | O |

As clear from Table 1 and Table 2, the packing mainly made of nitrile hydride rubber with 25% to 36% of acrylonitrile satisfies the requirements of the packing to be used in the refuse processing machine, and is also excellent in forming performance. That is, the resistance to heat aging, resistance to steam, and durability to organic acid, amines and other alkalis, vegetable oil and animal oil from the waste are excellent for a long period, so that the refuse processing machine can be used safely and comfortably for a long time without leak of smell.

Figure 10:
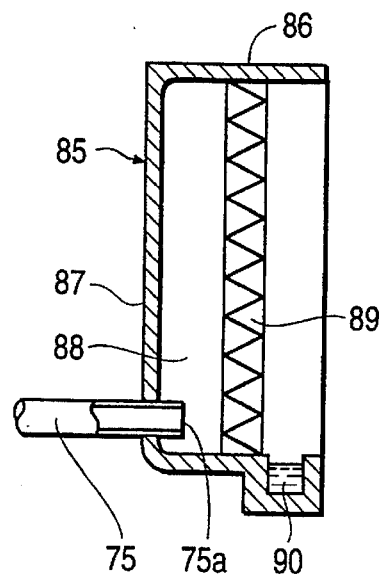
FIG. 10 is a sectional view showing an embodiment of a deodorizing device.

In the fourth embodiment, the catalytic reaction device is used as the means for deodorizing, but other constitution for deodorizing is shown in FIG. 10. In the diagram, numeral 85 is a deodorizer, and a deodorizing filter 89 is disposed in a specific space 88 against a side wall 87 of a case 86. The deodorizing filter 89 is made of, for example, paper or nonwoven cloth, and impregnates deodorizing medium. In the bottom of the case 86, an evaporation pan 90 is provided to receive the condensate produced when the steam containing odor substances is cooled and condensed by the deodorizing filter 89. An exhaust pipe 75 penetrates through the side wall 87, and its front end opening 75a is positioned in the space 88. One side wall of the case 86 is opened to the fresh air.

The operation of thus composed deodorizing device is explained. The steam containing smell passes through the exhaust pipe 15, and is diffused into the space 88 from the opening 75a, and the odor substances are removed by the deodorizing filter 89, and the deodorized steam is released to the fresh air, in this process, one side of the deodorizing filter 89 is always facing the fresh air side, and its temperature is lower than the temperature of the steam released from the opening 75a, and therefore the steam is condensed by the deodorizing filter 89, and the condensate is collected in the evaporation pan 90 beneath the deodorizing filter 89. The condensate collected in the evaporation pan 90 is gradually evaporated to the fresh air.

Figure 11:
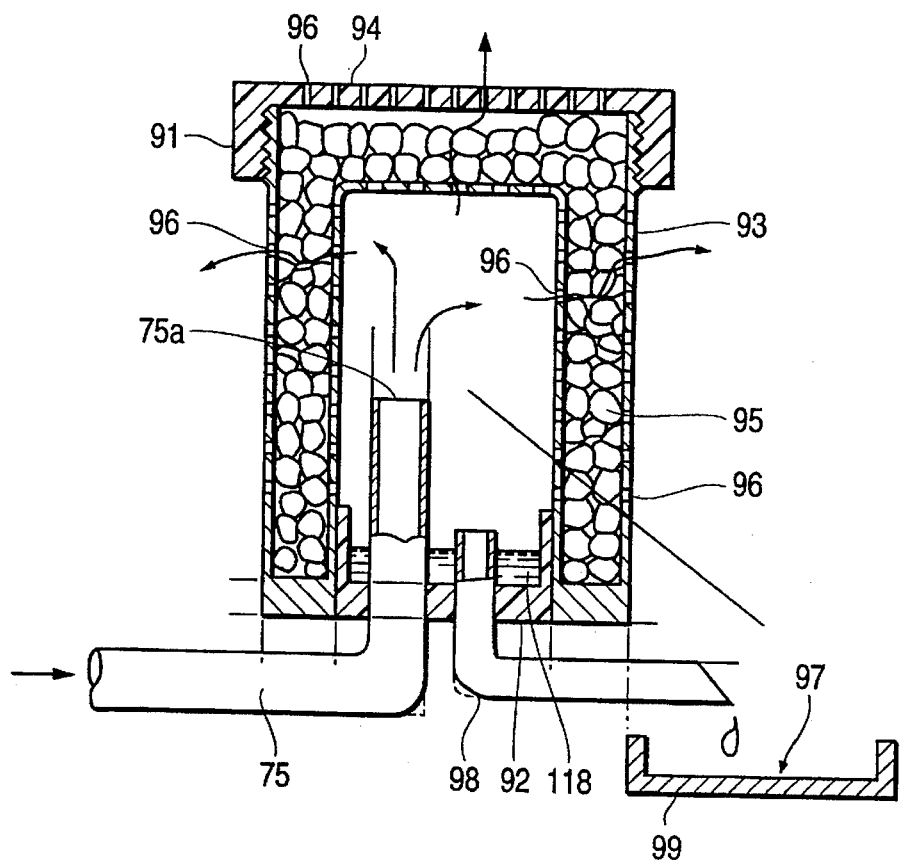
FIG. 11 is a sectional view showing other embodiment of a deodorizing device.

The constitution of a next deodorizing device is described in FIG. 11. In the diagram, numeral 91 is a deodorizing device, and a flat bottom plate 92, a tube 93 enclosing the bottom plate 92, and a lid 94 covering above the tube 93 compose an outer case. The tube 93 has double walls, and a deodorizing medium 95 made of granular activated carbon and others fills up the gap between the double walls. Plural holes are opened in the double walls of the tube 93 and the lid 94. In the space 97 formed by the bottom plate 92 and tube 93, the front end opening of an exhaust pipe is positioned. In the bottom plate 92, a drain pipe 98 penetrates, and an evaporation pan 99 is disposed at the discharge side of the drain pipe 98.

The operation of thus composed deodorizing device is described below. The steam containing smell is released into the space 97 from the front end opening 75a of the exhaust pipe 75, and passes through the holes 96 in the tube 93 to be sent out to the fresh air. The steam is condensed by the inner wall of the tube 93, and is deodorized by the deodorizing medium 95 when dry air passes through the tube 93. In this process, since the temperature of the inner wall of the tube 93 is lower than the temperature of the steam released from the front end opening 75a of the exhaust pipe, the steam is condensed in the inner wall of the tube 93, and the condensed water is collected in the bottom plate 92, and is discharged into the evaporation pan 99 through the drain pipe 98. The condensate collected in the evaporation pan 99 is gradually evaporated to the fresh air.

In this way, by using deodorizing filter or deodorizing medium instead of the catalytic reaction device, the odor generated from the refuse processing machine can be removed, too.

Figure 12:
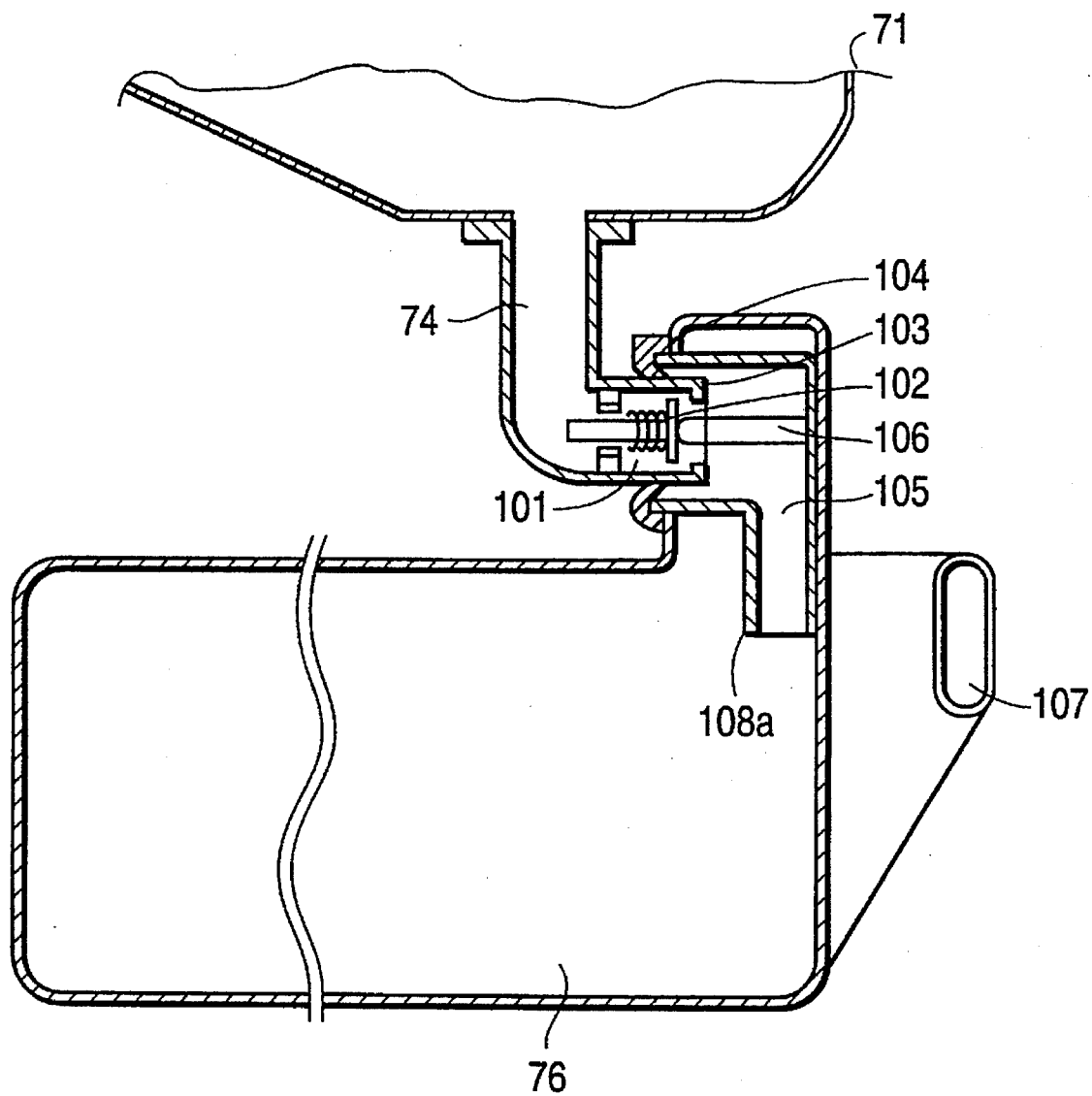
FIG. 12 is a sectional view showing the installation of a condensate container.
Figure 13:
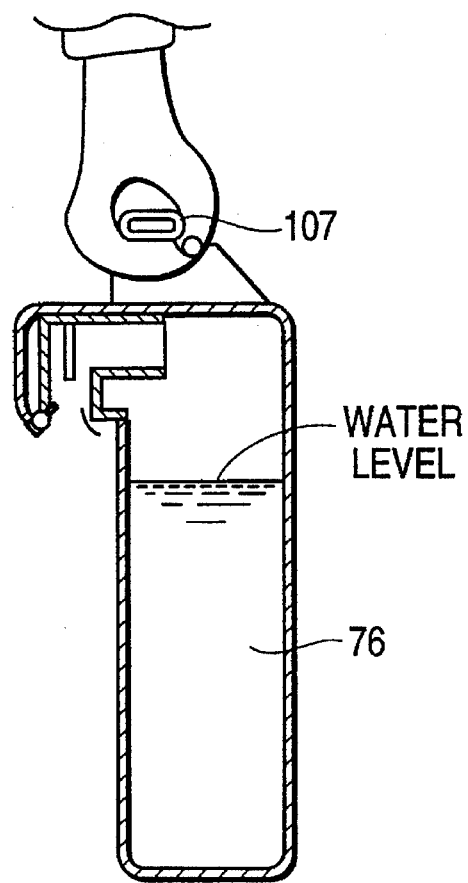
FIG. 13 is a sectional view of the condensate container.
Figure 14:
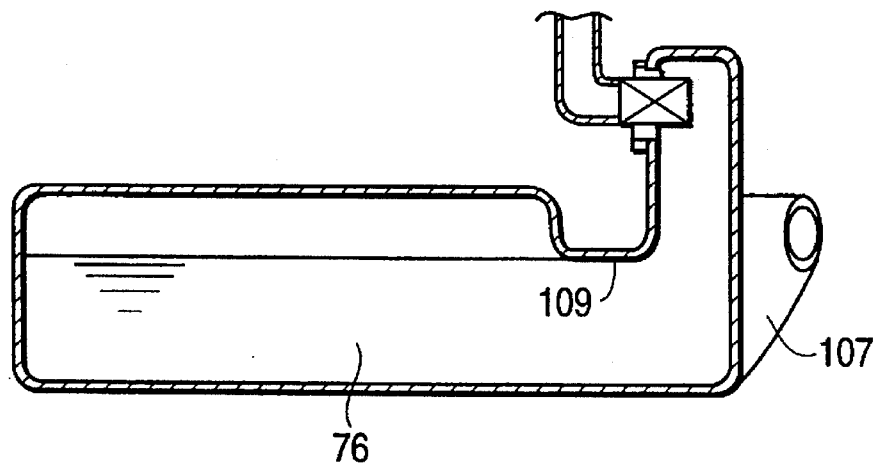
FIG. 14 is a sectional view showing other embodiment of a condensate container.

The mounting configuration of the condensate container is described in FIG. 12 to FIG. 14. In the bottom of the outer container 71 shown in FIG. 9, a condensate discharge pipe 74 is provided, and the condensate flows into the condensate container 76. The constitution of this condensate container 76 is specifically described. As shown in FIG. 12, at a front end 101 of the condensate discharge pipe 74, a movable valve 102 for partitioning the front end opening is provided, and the movable valve 102 is borne in the front end 101 through a spring 103. The front end 101 of the condensate discharge pipe 74 is inserted into a receiving part 105 of the condensate container 76, and by a seal part 104 provided in the receiving part of the condensate container 76, the front end 101 of the condensate discharge pipe 74 and the receiving part 105 of the condensate container 76 are connected water-tight. When the receiving part 105 of the condensate container 76 and the front end 101 of the condensate discharge pipe 74 are connected, the movable valve 102 is opened by a protrusion 106 provided in the receiving part 105, so that the condensate may flow into the condensate container 76. Numeral 107 is a handle provided in the condensate container 76.

If the condensate is collected too much in the condensate container 76 by forgetting to discard the condensate periodically, when the water level in the condensate container 76 reaches the lower end 105a of the receiving part 105 of the condensate container 76, the lower end 105a is positioned lower than the top surface of the inner wall of the condensate container 76, and hence the air in the condensate container 76 cannot escape out of the condensate container 76, and the condensate is not collected any more, thereby preventing the condensate from flowing out of the condensate container 76. Still more, as shown in FIG. 13, by taking out the condensate container 76, if the handle 107 is held by hand and carried, there is a volume of remaining air, so that the condensate may not spill over.

If the condensate is left over in the condensate discharge pipe 74 and outer container 71, when the condensate container 76 is removed, the protrusion 106 of the condensate container 76 is departed from the movable valve 102, and the movable valve 102 is closed by the force of the spring 103, thereby preventing the condensate from flowing out inside and outside the refuse processing machine to contaminate the surroundings.

Besides, as shown in FIG. 14, the lower end surface of the recess 109 is positioned above the condensate container 76 at a lower position than the top surface of the inner wall of the condensate container 76. Therefore, if the condensate is collected too much in the condensate container 76, when the water level in the condensate container 76 comes to the lower end of the recess 109, the air collected in the condensate container 76 cannot escape, thereby preventing the condensate from gathering further. If the condensate container 76 is taken out and carried, there is a volume of remaining air, so that the condensate may not spill over.

Figure 15:
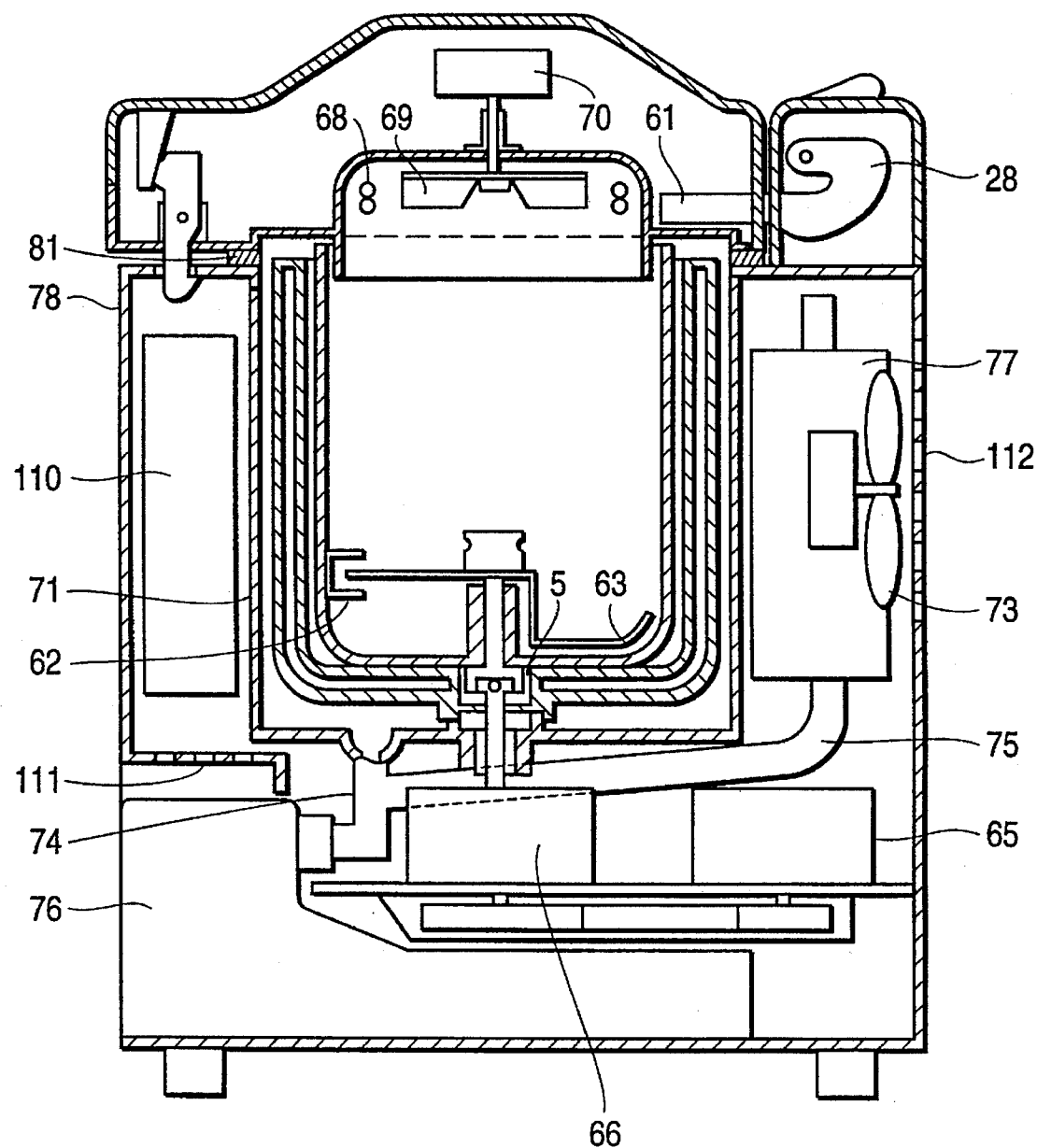
FIG. 15 is a sectional view of a refuse processing machine in a fifth embodiment of the invention.

Referring now to FIG. 15, the fifth embodiment of the invention is described below. Same constituent parts as in the fourth embodiment shown in FIG. 9 are identified with same reference numerals, and their explanations are omitted. Inside the refuse processing machine main body 78, a control circuit 110 and a catalytic reaction device 77 at a position confronting the control circuit are provided. The refuse processing machine main body 78 is provided with an air intake port 111 at the control circuit 110 side, and an exhaust port 112 at the catalytic reaction device 77 side. Air is taken in from a cooling fan 73 through the air intake port 111, and the control circuit 110 is cooled. The air cooling the control circuit 110 cools the outer wall of the outer container 71, and is exhausted from the exhaust port 112. The control circuit 110 controls the heater 68 and agitation fan 69.

In this constitution, the cooling air is first taken in from the air intake port 111, and cools the control circuit 110. Afterwards, the outer wall of the outer container 71 of large heating output is cooled, and therefore the control circuit 110 of lower heating output is cooled first, and the operation of the control circuit 110 is stabilized, so that malfunction of the control circuit 110 is prevented. Besides, the air once cooling the control circuit 110 is enough to cool the outer container 71 which has a larger heating output, and the condensing function of the outer container 71 functioning as the condenser can be exhibited sufficiently, and the drying time can be curtailed. Moreover, after cooling the outer container 71, the air is exhausted from the exhaust port 112, so that the temperature rise inside the refuse processing machine main body 78 can be suppressed.

Figure 16:
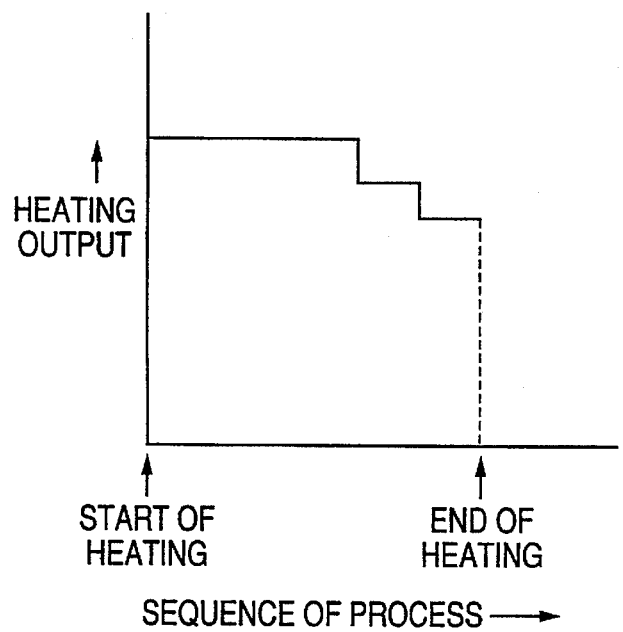
FIG. 16 is a diagram showing changes of heating output in drying process.

The control of the control circuit 110 is explained by reference to FIG. 16. The heater 68 and agitation fan 69 are operated to start heating action to dry the waste. In this initial phase of drying, the heating output of the heater 68 is set at maximum, and the drying speed of the waste is accelerated. After a specific time from start of heating, that is, in the final phase of drying, the heating output of the heater 68 is shifted down by one step or plural steps. By shifting down the heating output of the heater 68 thus in the final phase of drying, the cooling time from the end of drying can be shortened, and the total drying and processing time including the drying time and cooling time can be cut short. The cooling time is the time for setting in order to avoid risk of burn or other accident if the water is taken out in hot state. By shifting down the heating output of the heater 68, overdrying of the waste is prevented, so that scattering of dried waste is avoided.

Figure 17:
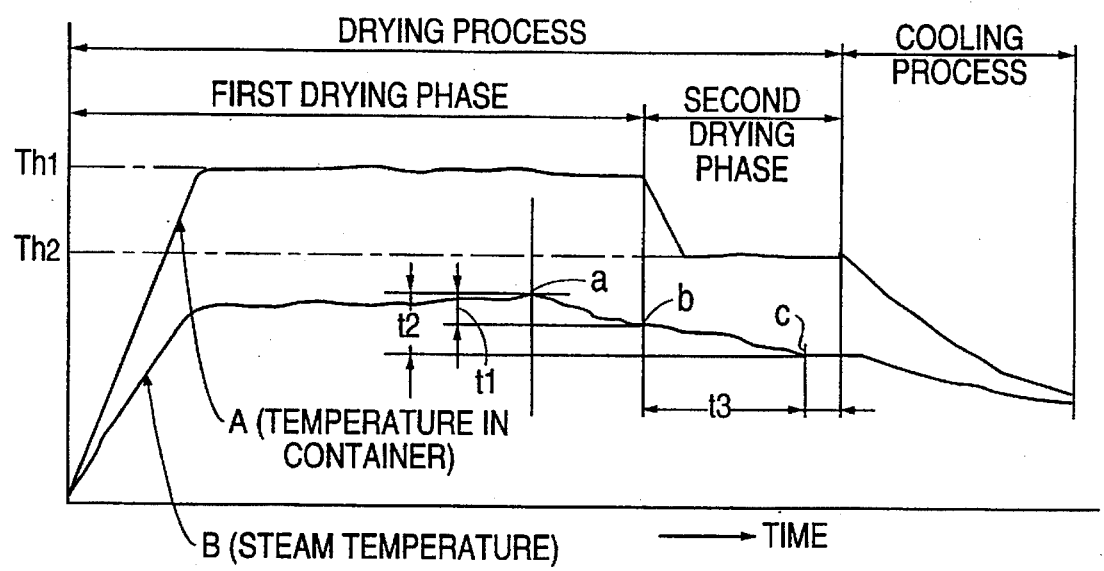
FIG. 17 is a changing characteristic diagram of steam temperature and container temperature in drying process.

Other method of shifting down the heating output of the heater 68 is explained in FIG. 17. In this method, the steam generated from the waste in the waste container 61 flows out to the outer container 71 side, and steam temperature detecting means is needed for detecting the temperature of the steam flowing out into the outer container 71. When heating is started, the steam temperature changes as indicated by curve B in FIG. 17. That is, the steam temperature rises gradually by heating, and as the drying process nears its end, the output of steam from the waste decreases, and the steam passing the outer container 71 is cooled more by the outer container 71, and the steam temperature drops gradually. The maximum value a of this changing steam temperature is read by the steam temperature detecting means, and the heating output of the heater 68 is shifted down the moment b when lowered by specified temperature t1 from the maximum value a. That is, the temperature A in the waste container 61 is first controlled to be Th1, and then shifted down to temperature Th2. It is the first drying phase from start of heating until the heating output is shifted down the first time, and the first drying phase is followed by the second drying phase. The second drying phase is terminated when the maximum steam temperature a is lowered by specified temperature t2 at time c. Or, finishing the second drying phase at the moment of passing the specified time t3 from the start moment b of the second drying phase, and it is shifted to the final cooling process. In the cooling process, heating of the heater 68 is stopped, and the refuse processing machine is cooled. In this method, since the heating output of the heater 68 can be controlled according to the end of drying, optimum shift-down of the heater is possible depending on the kind and volume of waste.

Figure 18:
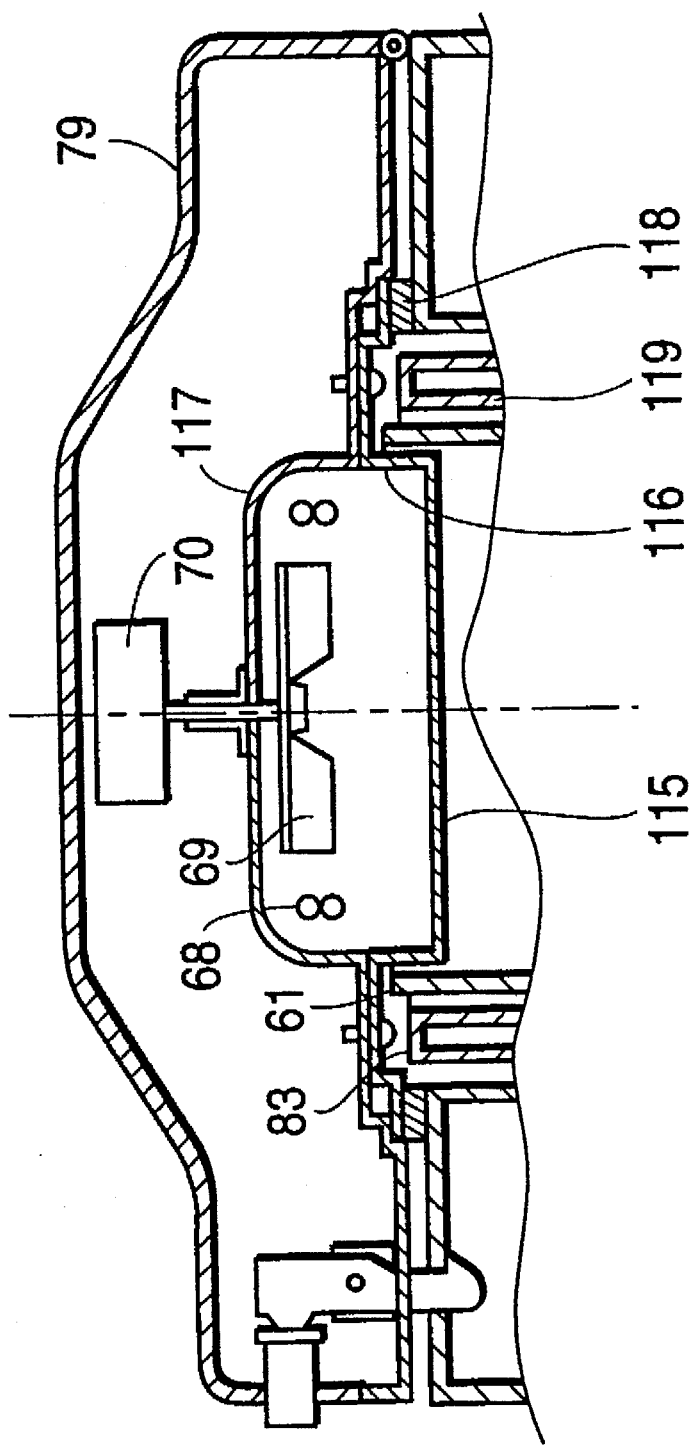
FIG. 18 is a sectional view around heating means.

The mounting configuration of the heating means is described by reference to FIG. 18. As the heating means, the heater 68 and agitation fan 69 are incorporated in the lid 79. The lid 79 covers over the waste container 61, middle container 83, and outer container 71. The lower parts of the heater 68 and agitation fan 69 are covered with guard member 116 of tubular shape with a bottom. In the bottom of the guard member, a ventilation hole 115 is formed. The bottom of the guard member 116 is positioned beneath the upper end of the waste container 61, and part of the guard member 116 gets into the waste container 61. The air flow released from the agitation fan 69 flows down spirally along the inner wall of the guard member 116, and since the lower part of the guard member 116 gets into the waste container 61, the air flow released from the guard member 116 does not flow out to the side of the middle container 83 and outer container 71, thereby contributing to drying of the waste in the waste container 61. Therefore, by blowing the hot air released from the guard member 116 against the waste, the waste can be dried effectively.

On the outer edge of the guard member 116, a seal member 118 is provided, and the heater 68 and agitation fan 69 are mounted on a heater board 117. The guard member 116 is mounted on the heater board 117 by means of screws 119. Hence, by removing the screws 119, the guard member 116 may be easily dismounted from the heater board 117, thereby facilitating the maintenance of the heater 68, agitation fan 69, and seal member 118.

Figure 19:
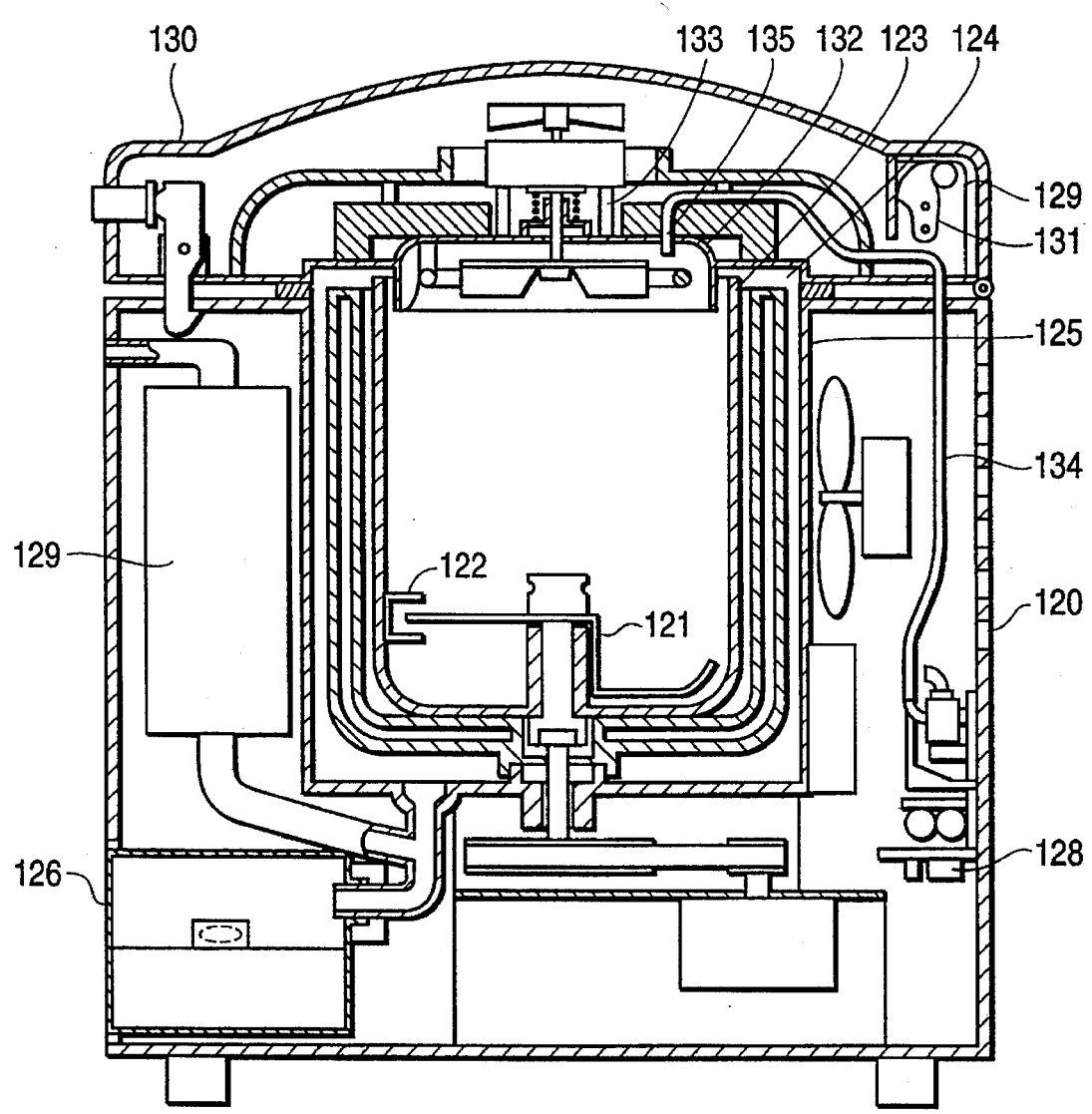
FIG. 19 is a sectional view of a refuse processing machine in a sixth embodiment of the invention.

The sixth embodiment of the invention is described by reference to FIG. 19 and FIG. 20. In FIG. 19, inside a refuse processing machine main body 120 are incorporated a waste container 123 comprising a rotary blade 121 and a stationary blade 122, a middle container 124, an outer container 125, a condensate container 126 for collecting condensate from the outer container 125, a catalytic reaction device 127 for removing odor from the air containing odor discharged from the outer container 125, and an ozone charging device 128 for charging ozone into the waste container 123. Above the refuse processing machine main body 120, a lid 130 is provided. The lid 130 is designed to be opened and closed on a hinge 129, and opening or closing state of the lid 130 is detected by a microswitch 131 provided near the hinge 129. Inside the lid 130, a heater 132 and an agitation fan 133 are disposed as heating means, and it is constituted to heat and dry the waste. The ozone generated from the ozone charging device 128 is led into the lid 130 through a pipe 134, and the ozone is charged into the waste container 123 from an ozone inlet 135 formed in part of the lid 130. The ozone inlet 135 is formed on the outer circumference of the agitation fan 133, and the ozone is charged uniformly into the waste container 123 thanks to the agitation function of the agitation fan 133.

Figure 20:
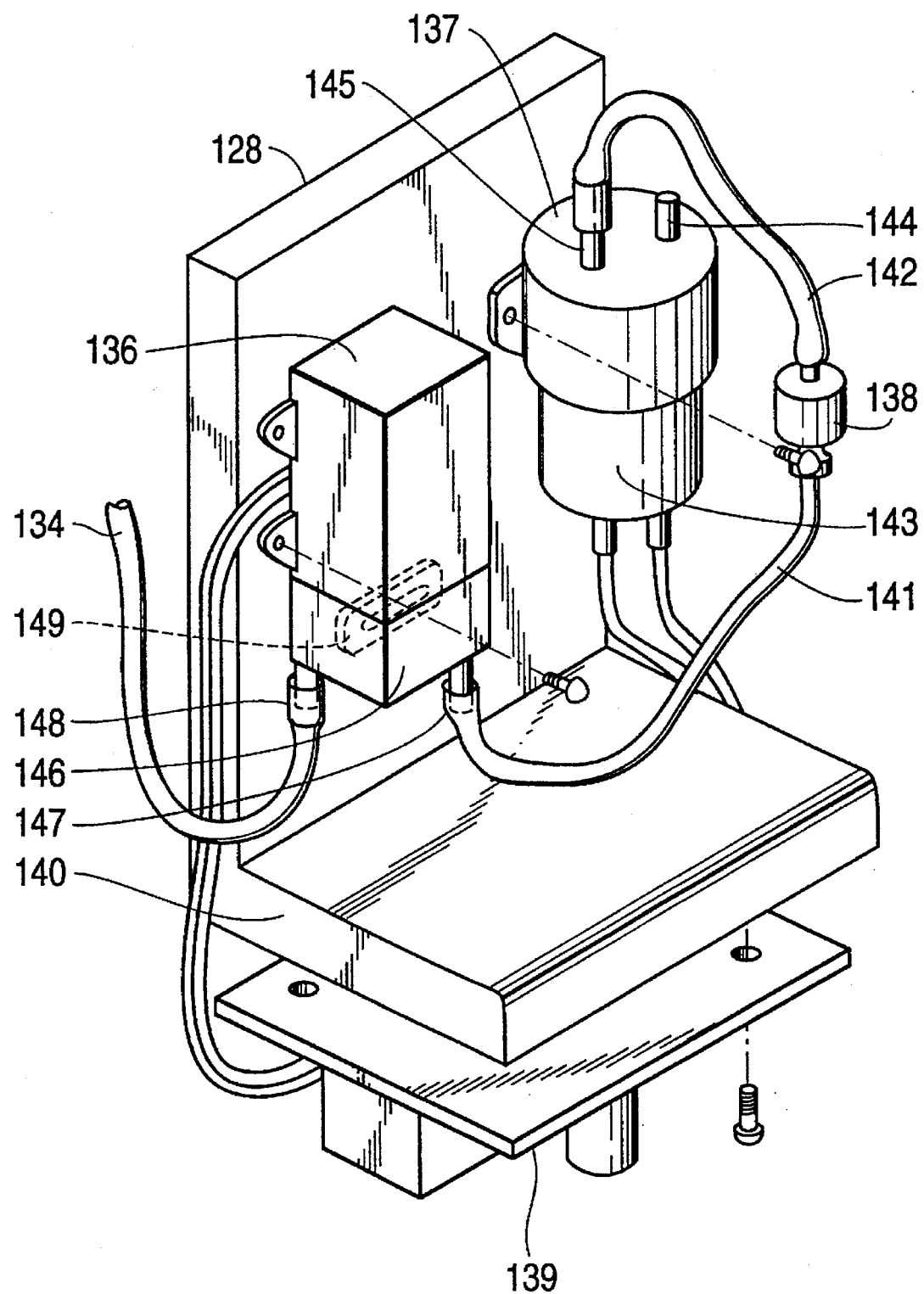
FIG. 20 is an appearance perspective view of an ozone charging device.

A specific constitution of the ozone charging device 128 is described in FIG. 20. The ozone charging device 128 consists of an ozone generator 136 for generating ozone by applying a high voltage of about 3.5 kV to the electrode and discharging from the electrode, a pump 137 for sending the ozone into the waste container 123 through a pipe 134, a counter flow preventive pipe 138 for preventing the ozone from flowing back from the waste container 123 into the ozone generator 136, a control circuit 139 for controlling the drive of ozone generator 136 and pump 137, a support plate 140 for mounting the pump 137, ozone generator 136 and control circuit 139, a tube B141 for linking the ozone generator 136 and counter flow preventive pipe 138, and a tube C142 for linking the counter flow preventive pipe 138 and pump 137.

The pump 137 reciprocally moves the built-in valve by the rotation of the motor 143, and sends out the air flowing in from a suction port 144 to an exhaust port 145, and sends into a high voltage discharge unit 146 of the ozone generator 136 through the tube C142, counter flow preventive pipe 138, and tube B141. The air inhaled from a suction port 147 of the ozone generator 136 produces ozone from an electrode 149 in the high voltage discharge unit 146. The ozone generated in the ozone generator 136 is sent out from an exhaust port 148, and is charged into the waste container 123 through the pipe 134. The suction port 147 and exhaust port 148 of the ozone generator 136 are formed at positions lower than the electrode 149, and the suction port 144 and discharge port 145 of the pump 137 are mounted on the support plate 140 so as to be located at higher positions than the high voltage discharge unit 146 of the ozone generator.

Figure 21:
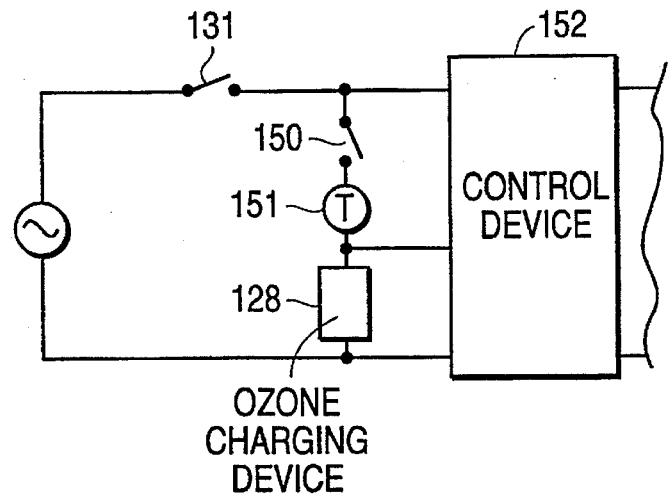
FIG. 21 is a circuit diagram showing connection of the ozone charging device and switches.

The control circuit constitution of the ozone charging device is described by reference to FIG. 21. In the diagram, numeral 150 is an operation switch of the ozone charging device 128, and when the operation switch 150 is turned on while the specified processing is stopped, a timer 151 is actuated, and the ozone charging device 128 is actuated, and the generated ozone is charged into the waste container 123, and after the time set by the timer 151, the ozone charging device 128 is stopped, and ozone charging ceases. The ozone charging device 128 is connected to the microswitch 131 which is turned on or off by opening or closing of the lid, and the operation of the ozone charging device 128 is stopped when the lid is open. Numeral 152 is a control unit for controlling the operation of the refuse processing machine.

The operation of the refuse processing machine is described. By grinding and stirring the waste by the stationary blade 122 and rotary blade 121 in the drying process, the charged waste is almost uniformly heated and dried. In ordinary drying process, the ozone charging device 128 operates in synchronism with the rotation timing of the rotary blade 121, and the ozone generated in the high voltage discharge unit 146 of the ozone generator 136 is charged into the waste container 123. When the waste is ground and stirred, the gas components staying in the waste are released into the waste container 123, but the charged ozone is decomposed into oxygen molecules and activated oxygen atoms, and the decomposed activated oxygen atoms oxidize the gas components and waste, and reduce the odor. At this time, the ozone decomposition is promoted by high temperature at around 130 deg. C. and steam in the waste container 123, and oxidation action is actively performed.

The drying process is followed by the cooling process, and ozone is charged continuously for a specific time. At this time, aside from the dried waste, the odor can be also reduced in the waste container 123 and middle container 124 having odor by a series of processing. Therefore, after the drying process, the lid 130 is opened, the waste container 123 is taken out, and the waste in the waste container 123 is discarded, and then the waste container 123 is put back into the refuse processing machine main body 120, and in this series of operations, the smell released from the waste and refuse processing machine main body 120 is very small, and the workers do not feel unpleasant.

However, depending on the kind of the waste to be processed, a strong odor may smell when the lid 130 is opened to discharge the waste even after the series of drying process. At this time, the lid 130 is closed, the operation switch 150 is pressed to operate the ozone charging device 128, and the ozone is charged into the refuse container 123 for a specific time set by the timer 151. This charging operation time is about more than ten seconds, and the ozone charging amount is harmless for human body, and the temperature in the waste container 123 is lowered almost to the ambient temperature, and therefore ozone decomposition, that is decomposition into oxygen molecules and activated oxygen atoms is promoted slowly, and the deodorizing action is lowered as compared with that during drying process, but the air staying in the waste container 123 after drying process can be sufficiently deodorized.

By the action of the timer 151, once the operation switch 150 is pressed, the operation of the ozone charging device 128 continues without having to push continuously, and a small amount of ozone harmless to human body is charged, so that the safety may be maintained, while the controllability may be enhanced. Or, when the lid 130 is opened during operation of the ozone charging device 128, the microswitch 131 is opened, and the ozone charging device 128 is stopped, so that the worker opening the lid 130 may not directly inhale the ozone, and the safety is guaranteed.

Moreover, the ozone charging device 128 is composed as a unit as the ozone generator 136, pump 137, and control circuit 139 are supported on the support plate 140, and therefore when assembling the refuse processing machine, the unit of the ozone charging device can be installed easily.

Incidentally, the discharge port 145 of the pump 137 is located at a higher position than the high pressure discharge unit 146 of the ozone generator 136, the ozone heavier than the molecular weight of the air is gathered near the high voltage discharge unit 146. Right after operation of the ozone charging device 128, while the ozone is left over in the tube B141 and tube C142, gas is released from the waste in the drying process, and pressure in the waste container 123 is heightened, and if the air in the waste container 123 flows into the high voltage discharge unit 146 of the ozone generator 136 through the pipe 134, the ozone is gathered near the high voltage discharge unit 146, and hence the ozone does not flow back into the pump 137, and deterioration of the valve in the pump 137 by ozone and lowering of blowing capacity are prevented, so that a sufficient durability may be assured. The counter flow preventive pipe 138 is for preventing invasion of ozone into the pump 137 in the event of a sudden pressure rise in the waste container 123.

In the drying process, the waste container 123 is filled up with steam. Part of the steam invades into the pipe 134, and dew condenses in the pipe 134 when the ambient temperature is low, and water drops fall in the pipe 134 and collected in the high voltage discharge unit 146 of the ozone generator 136. However, since the discharge port 148 is provided beneath the discharge electrode 149 and high voltage discharge unit 146, when the ozone charging device 128 is put in operation, the dew condensation water collected in the high pressure discharge unit 146 is discharged again, into the waste container 123 by the air sent out from the pump 137, and the discharge electrode 149 generates heat so as to dry quickly, and the ozone may be generated normally. As compared with the amount of dew condensation water generated in the pipe 134, when the volume of the space between the lower end of the high voltage discharge unit 146 and the discharge electrode 149 is sufficiently large, dew condensation water will not splash over the discharge electrode 149, and ozone may be generated immediately.

Figure 22:
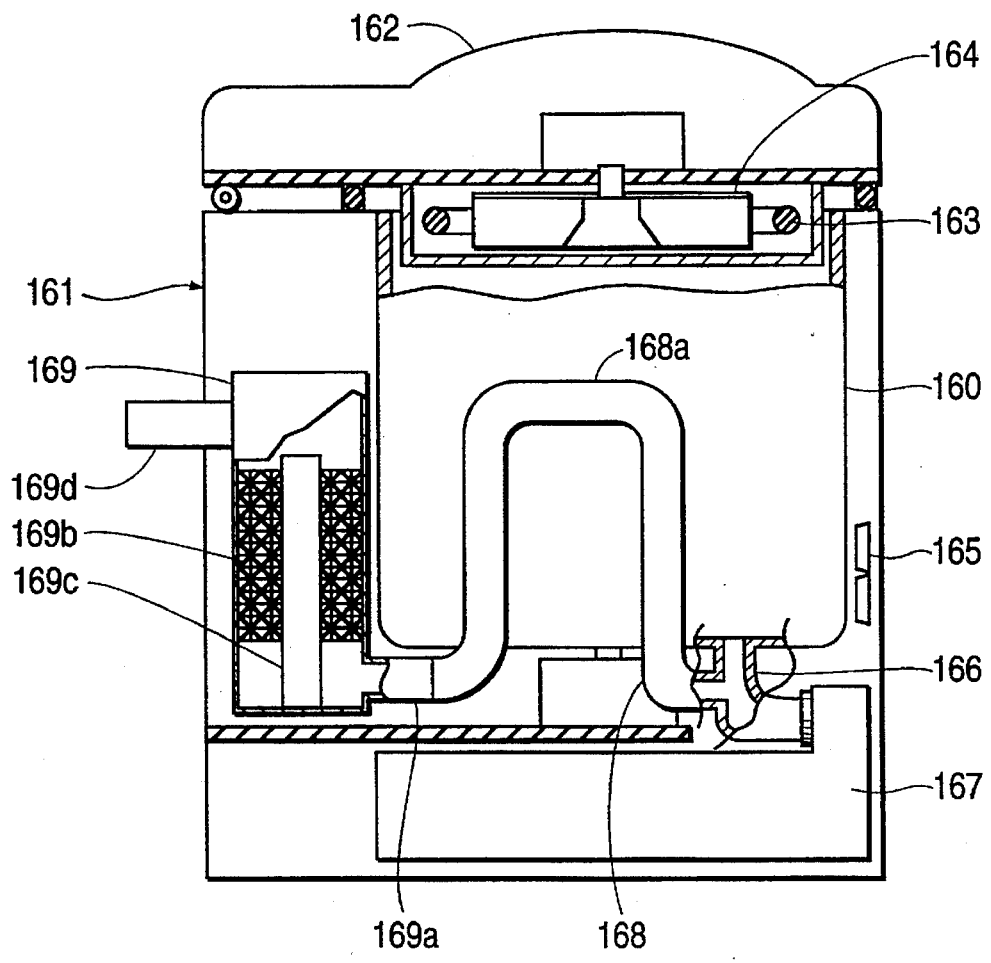
FIG. 22 is a sectional view of a refuse processing machine in a seventh embodiment of the invention.

The seventh embodiment of the invention is explained by reference to FIG. 22. An outer container 160 accommodating a waste container is incorporated in a refuse processing machine main body 161. In the upper part of the refuse processing machine main body 161, a free-to-open lid 162 is provided, and a heater 163 and an agitation fan 164 for heating and drying the waste are incorporated in the lid 162. The outer wall of the outer container 160 which is a condenser is cooled by a cooling fan, and the steam generated from the waste is condensed. The condensate in the outer container 160 is collected in the condensate container 167 through the condensate pipe 166. A part of the condensate pipe 166 is branched off, and an exhaust pipe 168 is connected. The exhaust pipe 168 is connected to a suction pipe 169a of a deodorizing device 169, and the air containing odor discharged from the outer container 160 is sent into the deodorizing device 169. The deodorizing device 169 incorporates a honeycomb catalyst 169b and a catalyst heater 169c. The air containing smell flowing in from the suction pipe 169a is deodorized by the catalyst 169b, and is discharged outside from an exhaust pipe 169d. The exhaust pipe 168 rises between the condensate pipe 166 and deodorizing device 169, so that the upper part 168a of the exhaust pipe 168 may be located approximately up to the height of the middle of the outer container 160.

The operation of thus composed refuse processing machine is described. The condensate condensed in the outer container 160 is collected in the condensate container 167, but if used continuously without noticing the full level of the condensate container 167, or if the waste spilling over the waste container is clogging the condensate pipe 166, the operation is as follows. In such cases, the condensate is collected in the outer container 167, but since the exhaust pipe 166 is standing up, the condensate in the outer container 160 is prevented from flowing into the deodorizing device 169 through the exhaust pipe 168, and damage of the catalyst 169b and catalyst heater 169c by condensate can be prevented. Since the upper part 168a of the exhaust pipe 168 is raised up to the middle part of the outer container 160, the condensate will not flow into the deodorizing device 169 as far as the condensate in the outer container 160 does not higher than the middle height of the outer container. Still more, when the outer container 160 is filled up with condensate nearly halfway, the waste container in the outer container 160 floats, telling that the condensate is collected.

Figure 23:
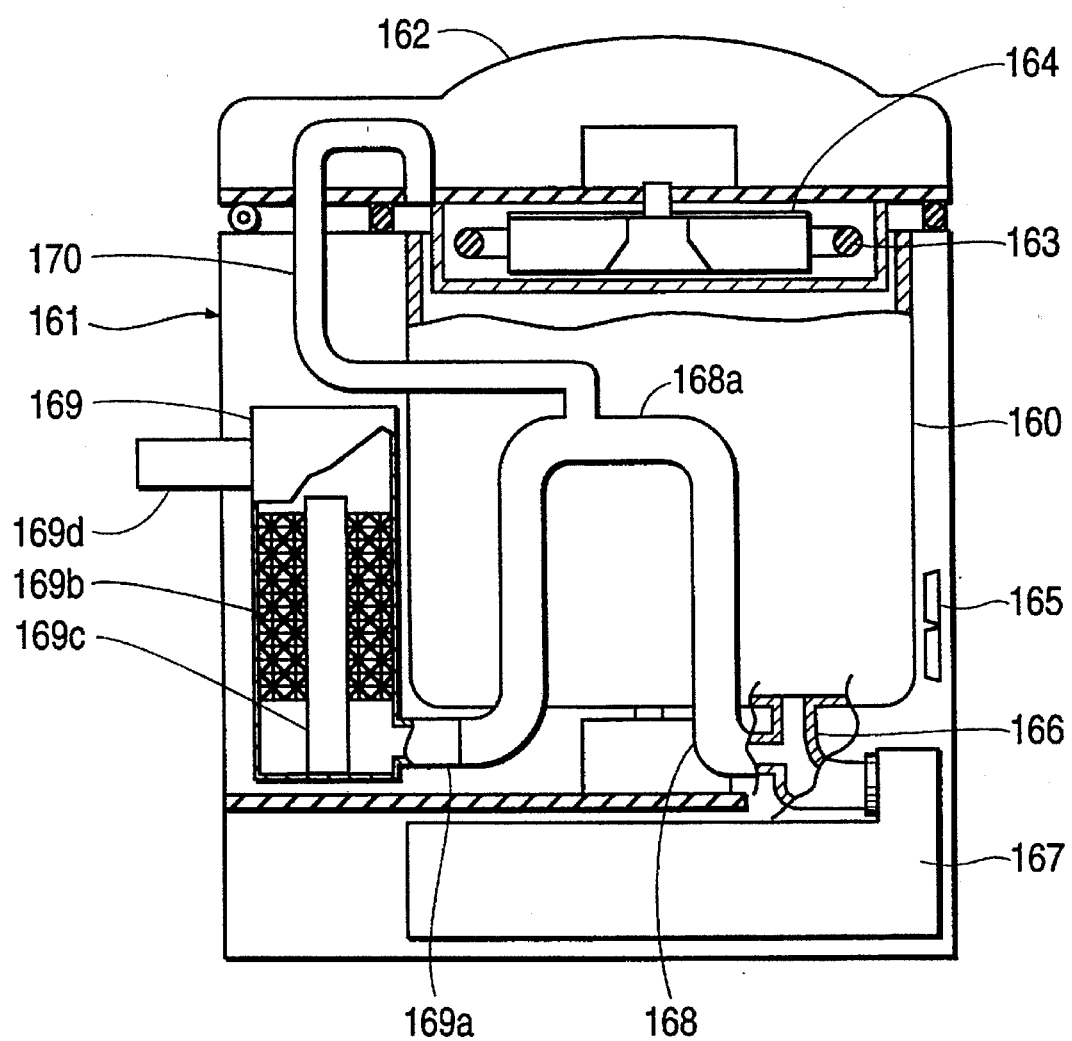
FIG. 23 is a sectional view showing other embodiment changing the connection of exhaust pipe.

Besides, as shown in FIG. 23, a part of the upper part 168a of the exhaust pipe 168 is branched off, and a bypass tube 170 is connected, and the front end of the bypass tube 170 is positioned above the outer container 160. According to this constitution, the condensate is collected in the exhaust pipe 168, and when the steam in the outer container 160 is no longer discharged, drying is imperfect, but from the front end opening of the bypass tube 170, the steam in the outer container 160 can be sent out to the deodorizing device 169 side, thereby preventing the drying process from finishing in imperfect state. Moreover, since the steam in the outer container 160 is allowed to escape through the bypass tube 170, the pressure in the outer container 160 is prevented from becoming too high to allow the steam to leak out from between the outer container 160 and lid 162, so that the odor is prevented from spreading over around the refuse processing machine main body.

Figure 24:
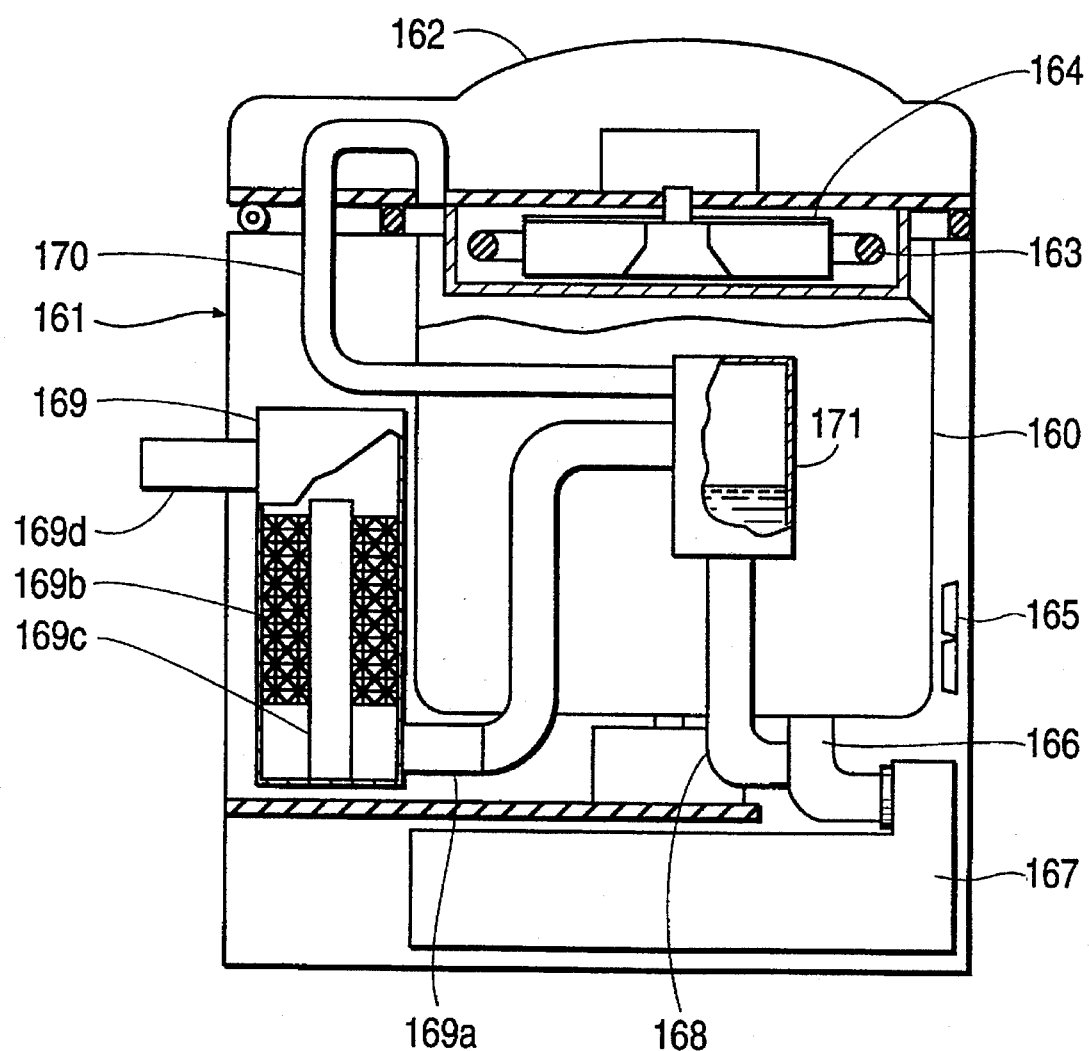
FIG. 24 is a sectional view showing a different embodiment changing the connection of exhaust pipe.

Or, as shown in FIG. 24, an auxiliary tank 171 is provided in part of the exhaust pipe 168, and fluctuations of the steam flowing out from the outer container 160 are absorbed, and the load applied to the deodorizing device 169 is made uniform. That is, the steam volume flowing from the outer container 160 into the exhaust pipe 168 is not uniform, but variable depending on the waste volume and waste heating temperature, and by absorbing the fluctuations by the auxiliary tank 171 to keep constant the steam volume flowing out into the deodorizing device 169, and stable deodorization is effected in the deodorizing device 169, thereby preventing the steam from being supplied more than the deodorizing capacity of the deodorizing device 169 and the odor from being released to the atmosphere. In all embodiments described above, the electrically controlled heater is used as a heating means. However, as a heating means, the other means such as heat generating magnetron, gas burner, kerosene burner, can also be used.

We claim:

1. A refuse processing machine comprising: a detachable waste container for storing waste, a grinding and stirring means comprising upper and lower blades located at the bottom of the waste container that are intermittently and repeatedly operated for grinding and/or stirring the waste in the waste container, and a waste heating means comprising an agitation fan and a heater, said waste heating means blowing hot air on an upper surface of the waste in the waste container.

2. A refuse processing machine of claim 1, wherein the grinding and stirring means operates in a specified time after start of heating by the heating means.

3. A refuse processing machine of claim 1, wherein the grinding and stirring means comprises a stationary blade provided in the inner wall of the waste container, and a rotary blade provided at the inner bottom of the waste container.

4. A refuse processing machine of claim 3, wherein the rotary blade consists of upper and lower stages, and the front end of one blade is formed nearly horizontal to the stationary blade and the other one intersects nearly vertically to the stationary blade.

5. A refuse processing machine of claim 3, wherein the rotary blade rotates intermittently by repeating rotating and stopping, said rotary blade inverting the rotating direction in every said intermittent revolution.

6. A refuse processing machine of claim 1, wherein the waste heating means is provided on a lid free to open and close over the waste container.

7. A refuse processing machine of claim 1, further comprising a deodorizing device linked with a condensing unit for removing the odor released from the waste.

8. A refuse processing machine of claim 7, wherein the deodorizing device is composed of catalyst and heater for heating the catalyst.

9. A refuse processing machine of claim 7, wherein the deodorizing device is composed of deodorizing filter.

10. A refuse processing machine of claim 1, further comprising a control circuit for controlling a heating capacity of the heater, said control circuit heating the waste by using a maximum heating capacity in an initial stage of operation and thereafter lowering the heating capacity.

11. A refuse processing machine of claim 10, further comprising a steam temperature detecting means for detecting the temperature of the steam generated from the waste, wherein the control circuit lowers the heating output after the temperature detected by the steam temperature detecting means, is lowered from the maximum temperature by a specific temperature.

12. A refuse processing machine of claim 1, wherein the waste heating means is provided on a free-to-open lid to cover over the waste container, and the waste heating means is covered by a cover having numerous openings.

13. A refuse processing machine of claim 1, further comprising ozone charging means for charging ozone into the waste container.

14. A refuse processing machine of claim 1, further comprising a condenser unit for condensing the steam generated from the waste.

15. A refuse processing machine of claim 14, further comprising a condensate container linked with the condensing unit to recover the condensate.

16. A refuse processing machine of claim 15, wherein a detector for detecting the amount of water is provided in or on the condensate container.

17. A refuse processing machine of claim 14, wherein the condensing unit is composed of an outer container for storing the waste container, and a cooling fan for cooling the outer wall of the outer container.

18. A refuse processing machine of claim 17, wherein the waste container is detachably put in the outer container.

19. A refuse processing machine of claim 17, wherein the waste container is made of insulating material.

20. A refuse processing machine of claim 17, wherein an insulated container for partitioning between the outer container and waste container is provided.

21. A refuse processing machine of claim 12, further comprising a lid free to open or close the upper opening of the outer container storing the waste container, and a packing means made of a material mainly composed of nitride hydride rubber with about 25% to about 36% of acrylonitride for sealing the opening of the outer container and the lid when closing the lid.

22. A refuse processing machine of claim 14, wherein the condensing unit is composed of an outer container for storing the waste container, the outer container and condensate container are linked with a communication pipe, and a movable valve is provided in the front end opening of the communication pipe, and the movable valve is opened and closed in cooperation with the inserting action of the condensate container.

* * * * *

UNITED STATES PATENT AND TRADEMARK OFFICE
CERTIFICATE OF CORRECTION

PATENT NO. : 5,634,600
DATED : June 3, 1997
INVENTOR(S) : Kubota, et al.

It is certified that error appears in the above-indentified patent and that said Letters Patent is hereby corrected as shown below:

Claim 22, lines 4 and 6 delete "communication"

Signed and Sealed this

Tenth Day of March, 1998

Attest:

BRUCE LEHMAN

*Attesting Officer*     *Commissioner of Patents and Trademarks*